(12) United States Patent
Nakatani et al.

(10) Patent No.: US 7,869,092 B2
(45) Date of Patent: Jan. 11, 2011

(54) IMAGE PROCESSING APPARATUS, PRINTING APPARATUS, AND IMAGE PROCESSING METHOD

(75) Inventors: Akihiko Nakatani, Kawasaki (JP); Makoto Torigoe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/611,768

(22) Filed: Nov. 3, 2009

(65) Prior Publication Data
US 2010/0046018 A1   Feb. 25, 2010

Related U.S. Application Data

(62) Division of application No. 11/279,278, filed on Apr. 11, 2006, now Pat. No. 7,636,178.

(30) Foreign Application Priority Data

Apr. 15, 2005  (JP)  ............................... 2005-118227

(51) Int. Cl.
*H04N 1/60*  (2006.01)
(52) U.S. Cl. ..................... 358/1.9; 358/523; 358/524; 347/43
(58) Field of Classification Search ................. 358/1.9, 358/518, 519, 520, 3.02, 521, 523, 524; 382/162, 382/167; 347/19, 43, 100
See application file for complete search history.

(56) References Cited

U.S. PATENT DOCUMENTS

| 5,309,258 | A | 5/1994 | Kouno et al. |
| 5,386,305 | A | 1/1995 | Usami |
| 5,909,291 | A | 6/1999 | Myers et al. |
| 6,267,519 | B1 | 7/2001 | Otsuki et al. |
| 6,336,705 | B1 | 1/2002 | Torigoe |
| 6,499,829 | B1 | 12/2002 | Tabata et al. |
| 6,880,915 | B2 * | 4/2005 | Shimada ....................... 347/43 |
| 6,924,819 | B2 | 8/2005 | Nishida et al. |
| 6,980,326 | B2 | 12/2005 | Tsuchiya et al. |
| 7,016,530 | B2 | 3/2006 | Saito et al. |
| 7,034,844 | B2 | 4/2006 | Akiyama et al. |
| 7,079,152 | B2 | 7/2006 | Akiyama et al. |
| 7,488,053 | B2 * | 2/2009 | Shimada ....................... 347/43 |

(Continued)

FOREIGN PATENT DOCUMENTS

JP    2000-198227    7/2000

(Continued)

OTHER PUBLICATIONS

Office Action dated Aug. 21, 2009 in JP 2006-110159.

*Primary Examiner*—Kimberly A Williams
(74) *Attorney, Agent, or Firm*—Fitzpatrick, Cella, Harper & Scinto

(57) ABSTRACT

In an image processing for printing a monochrome image, color deviation can be suppressed to print a favorable monochrome image. Specifically, the printing of a monochrome image is performed by using black ink in all of a color reproduction region (color gamut) including a gray axis and regions other than the gray axis. This avoids the use of C, M, and Y for the expression of the monochrome image to suppress the color deviation due to slight imbalance among amounts of three colors of inks.

10 Claims, 23 Drawing Sheets

U.S. PATENT DOCUMENTS

| | | |
|---|---|---|
| 2003/0038870 A1* | 2/2003 | Shimada .................... 347/100 |
| 2003/0048464 A1 | 3/2003 | Yamada et al. |
| 2003/0052894 A1 | 3/2003 | Akiyama et al. |
| 2003/0103234 A1* | 6/2003 | Takabayashi et al. ...... 358/1.15 |
| 2003/0202194 A1 | 10/2003 | Torigoe et al. |
| 2004/0126009 A1 | 7/2004 | Takenaka et al. |
| 2004/0145759 A1 | 7/2004 | Nishida et al. |
| 2005/0219618 A1* | 10/2005 | Shimada .................... 358/520 |
| 2006/0055948 A1 | 3/2006 | Ozaki et al. |
| 2006/0187231 A1 | 8/2006 | Akiyama et al. |
| 2006/0232799 A1 | 10/2006 | Nakatani et al. |
| 2007/0171440 A1* | 7/2007 | Yoshida ..................... 358/1.9 |
| 2008/0055679 A1 | 3/2008 | Yoshida |
| 2009/0195602 A1* | 8/2009 | Shimada ..................... 347/43 |

FOREIGN PATENT DOCUMENTS

| | | |
|---|---|---|
| JP | 2003-143422 | 5/2003 |
| JP | 2004-48262 | 2/2004 |
| WO | 2005-009027 | 1/2005 |

* cited by examiner

IMAGE PROCESSING APPARATUS, PRINTING APPARATUS, AND IMAGE PROCESSING METHOD

This application is a divisional of U.S. patent application Ser. No. 11/279,278, filed Apr. 11, 2006, the contents of which are incorporated by reference herein.

BACKGROUND OF THE INVENTION

1. Field of the Invention

The present invention relates to an image processing apparatus, a printing apparatus, and an image processing method. In particular, the present invention relates to an image processing for determining an amount of color material for printing in generation of print data of a monochrome image.

2. Description of the Related Art

An ink jet printer image using a plurality of colors of inks as color materials has been widely known as an image formation apparatus for outputting an image. An electro-photographic type printer has been also known that uses toner as color material. These image formation apparatuses use three colors of cyan (C), magenta (M), and yellow (Y) or four colors of cyan (C), magenta (M), yellow (Y), and black (K) to represent various colors for printing by the subtractive color mixing.

The image formation as described above, however, often causes a situation where, when the printing is performed based on the respective signal values specifying amount of color materials such as C, M, and Y for example, colors intended by these signal values cannot be reproduced faithfully. For example, when sizes of dots formed by the respective color materials are slightly different from one another on a printing medium such as a paper, colors in a printed image composed of the collection of these dots may be observed as the ones slightly dislocated from intended one. This is caused, for example, when amounts (volumes) of ink droplets ejected from printing heads are slightly different depending on individual differences of heads or when the sizes of dots of a latent image formed on a photosensitive material are slightly different from one another in an electro-photographic type image formation apparatus. The slight difference in dot size is also caused by a relation between the type of a printing medium and the characteristic of color material (e.g., ink, toner). Furthermore, the dot size also changes due to the change of these image formation apparatuses with age.

As described above, a phenomena in which an actual color of a printed image is represented to have colors in a color space that are dislocated from colors (position coordinates) intended by a color material signal may be caused in many image formation apparatuses. Herein, such a phenomenon will be referred to as "color deviation".

Conventionally, so-called calibration has been known as a method to cope with this color deviation. For example, patches are printed by a target printer. Then a color conversion table, a gamma correction table or the like is changed or generated based on the colorimetry result of the patches to adjust amount of color materials to suppress the color deviation. The adjustment of color material is also performed by measuring volume of ink droplets ejected from individual printing heads to change an image processing in a similar manner for example.

However, when color deviation is caused in an image represented by black or gray as achromatic colors, such as monochrome image, it is relatively difficult to adjust the color deviation. Conventionally, gray of particularly low density has been frequently represented by superposing basic three colors of C, M, and Y at substantially the same amount (e.g., see Japanese Patent Laid Open No. 2000-198227). In this case, even a small change in amounts of color materials of the respective colors distorts the balance among the three colors, causing a relatively large shift of a hue. This makes it difficult to adjust the amount of the color materials itself. Furthermore, even a small change of the size of formed dots causes a significant change of the colors due to the same reason. This color deviation in gray means that a color of a chromatic color is slightly visible in the achromatic color, and thus the color deviation is noticeably observed.

FIG. 1 shows the contents of look-up table (LUT) for a color conversion described in Japanese Patent Laid Open No. 2000-198227 for a case where a gray image is printed. The horizontal axis represents 0 to 255 density levels (density values) represented by the respective 8 bit input data of R, G, and B for example for colors on a gray axis in a color space while the vertical axis represents output signal values (0 to 255) of the respective color inks, that is, ink amount (color material amount)) in order to express the respective density values. As shown in FIG. 1, gray is expressed by the three color inks of C, M, and Y in a range from a low density region to an intermediate density region. Specifically, output values of the respective three color inks shown in FIG. 1 are determined as gray having no color deviation in a predetermined color space. When the input density level exceeds about 176, the use of black ink (K) is started and the output signal value at the highest density level is about 128.

FIG. 2 shows another example of a conventional color conversion LUT. FIG. 2 shows, as in FIG. 1, ink amounts of the respective colors to express the colors of the gray axis in a color space. The example shown in FIG. 2 shows the color conversion LUT for a case where, in addition to cyan (C) ink and magenta (M) ink, light cyan (lc) and light magenta (lm) ink for which colorant such as dye has a lower density are used.

Recently, a high quality image comparable to an image by the silver halide photography has been required in the ink jet printer field. One of the major problems in this case is granular quality provided by a printed image to an observer. This granular quality is so-called visual roughness given to an observer when dots formed on a printing medium are conspicuous at a level that can be visually recognized. In order to reduce such granular quality, a plurality of types of inks for similar colors are used that have colorants having different densities as described above.

As shown in FIG. 2, in a low density region, inks of three colors of lc, lm, and Y are used to express gray. A process where the density is gradually increased from a low density causes discrete formation of dots. Thus, the inks having a lower density are used to reduce the granular quality. Output values of the respective three inks in this example are also determined as gray having no color deviation in a predetermined color space. In a region of an intermediate density, output values of lm and lc are close to the maximum value and thus the combination of these inks cannot express a further higher density. This density region also causes a great number of dots to be closely arranged on a printing medium, thus suppressing the granular quality due to individual dots from being conspicuous. Thus, C and M, and further K can be gradually added when this density region is approached to increase the density while suppressing the granular quality from appearing. At the same time, the output values of lc, lm and Y are gradually decreased. Finally, the output value of K has a value higher than those of the other inks, thus providing an expression of gray or black having a superior tone.

However, the methods for determining the ink amount described with reference to FIG. 1 and FIG. 2 as described above have the difficulty in adjustment of the color deviation of a monochrome image of gray or black as described above and also cause conspicuous color deviation.

In addition to these methods, Japanese Patent Laid Open No. 2000-198227 describes a mode for printing black characters or the like in which, in order to express a color of the gray axis, black (K) ink is used in whole regions from a low density region to a high density region. When is the granular quality is not required to be particularly considered, gray or black can be expressed by using K ink in whole density regions. This can suppress the color deviation due to unbalance in a case where gray is expressed by the three colors of C, M, and Y for example.

However, the above case may cause the color deviation where an unintended color appears in a monochrome image due to a characteristic owned by K ink itself or a relation between the K ink and a printing medium.

Furthermore, Japanese Patent Laid Open No. 2000-198227 does not suggest the use of K ink for whole density regions for colors other than those of the gray axis. Specifically, such a monochrome image also may be required that has some color tone, such as cold tone, warm tone, other than a pure black tone having a perfectly neutral color tone. This allows various monochrome images according to user's preference to be printed. In this case, it is desirable that a color adjustment is executed for the monochrome images so that monochrome images free from the color deviation and having adjusted color tone can be printed. However, it is clear that this request cannot be satisfied by only the technique as described in Japanese Patent Laid Open No. 2000-198227 for using K ink in whole density regions for colors of the gray axis.

SUMMARY OF THE INVENTION

It is an objective of the present invention to provide an image processing apparatus, a printing apparatus, and an image processing method that can suppress the color deviation to print a favorable monochrome image.

In a first aspect of the present invention, there is provided an image processing apparatus comprising:

color conversion means for converting color signals representative of an image into signals corresponding to color materials used for printing the image.

wherein the color conversion means converts the color signals into the signals corresponding to color materials so that the color material of an achromatic color is used in all of a color gamut including a gray axis and regions other than the gray axis.

Here, the color conversion may mean converts the color signals into the signals corresponding to color materials so that the color material of a chromatic color is used at an amount smaller than that of the color material of the achromatic color.

In a second aspect of the present invention, there is provided a printing apparatus for printing an image based on signals corresponding to a color material used for printing the image, the apparatus comprising:

color conversion means for converting color signals representative of an image into signals corresponding to color materials used for printing the image, wherein the color conversion means converts the color signals into the signals corresponding to color materials so that the color material of an achromatic color is used in all of a color gamut including a gray axis and regions other than the gray axis.

In a third aspect of the present invention, there is provided an image processing method comprising:

a color conversion step of converting color signals representative of an image into signals corresponding to color materials used for printing the image, wherein the color conversion step converts the color signals into the signals corresponding to color materials so that the color material of an achromatic color is used in all of a color gamut including a gray axis and regions other than the gray axis.

In a fourth aspect of the present invention, there is provided an image processing apparatus comprising:

means capable of setting a plurality of printing modes including a monochrome mode for printing a predetermined monochrome image and a color mode for printing a color image;

first color conversion means for converting color signals representative of the monochrome image into signals corresponding to color materials used for printing the monochrome image, when the monochrome mode is set as the printing mode; and second color conversion means for converting color signals representative of the color image into signals corresponding to color materials used for printing the color image, when the color mode is set as the printing mode, wherein the first color conversion means converts the color signals into the signals corresponding to color materials so that the color material of an achromatic color is used in all of the color gamut including a gray axis and hues other than the gray axis, wherein the second color conversion means converts the color signals into the signals corresponding to color materials so that the color material of an achromatic color is used in a part of the color gamut including the gray axis and hues other than the gray axis, and wherein the color gamut used for color conversion by the first color conversion means is smaller than that of a color gamut used for the second color conversion means.

In a fifth aspect of the present invention, there is provided an image processing apparatus comprising:

color adjustment means for performing a color adjustment for a monochrome image; and color conversion means for converting color signals representative of the monochrome image, which is subjected to the color adjustment by the color adjustment means, into signals corresponding to color materials used for printing the monochrome image, wherein the color conversion means converts the color signals into the signals corresponding to color materials so that the color material of an achromatic color is used in whole density range, which is defined by the color signals, in a gray axis and respective hues other than the gray axis in a color gamut including the gray axis and the hues.

In a sixth aspect of the present invention, there is provided an image processing apparatus comprising:

means for a monochrome mode for printing a predetermined monochrome image;

means for discarding a color component of color signals representative of an image to be printed when the monochrome mode is set;

means for performing a color adjustment for color signals color component of which has been discarded; and color conversion means for converting color signals, which is subjected to the color adjustment, into signals corresponding to color materials used for printing the monochrome image, wherein the color conversion means converts the color signals into the signals corresponding to color materials so that the color material of an achromatic color is used in whole density range, which is defined by the color signals, from a low density to a high density in a gray axis and respective hues other than the gray axis in a color gamut including the gray axis and the hues.

In a seventh aspect of the present invention, there is provided an image processing method comprising:

a color adjustment step of performing a color adjustment for signals representative of a monochrome image; and a color conversion step of converting color signals representative of the monochrome image, which is subjected to the color adjustment, into signals corresponding to color materials used for printing the monochrome image, by using a color conversion table, wherein the color conversion table is a table which converts the color signals into the signals corresponding to color materials so that the color material of an achromatic color is used in whole density range, which is defined by the color signals, in a gray axis and respective hues other than the gray axis in a color gamut including the gray axis and the hues.

In a eighth aspect of the present invention, there is provided a program for causing a computer to execute a color conversion processing for converting color signals representative of an image into signals corresponding to color materials used for printing the image, wherein the color conversion processing converts the color signals into the signals corresponding to color materials so that the color material of an achromatic color is used in all of a color gamut including a gray axis and regions other than the gray axis.

According to the above-described configuration, in every regions of a color reproduction region which include regions of a gray axis and regions other than those of the gray axis, achromatic color materials are used in whole density regions defined by image data. Thus, when a monochrome image of a black or a gray color is printed, a low density region and so on of the image also can be printed by achromatic color material such as black ink. This can suppress a color deviation due to an imbalance among three chromatic color materials of cyan, magenta and yellow when black or gray color of this low density region is expressed by these chromatic color materials.

Furthermore, the color reproduction region for which whole density regions use achromatic color material also includes not only regions of the gray axis but also regions surrounding these regions. Thus, even when bluish black or bluish gray color for example is desired by a color adjustment for a monochrome image, an appropriate color conversion is performed to suppress the color deviation.

Furthermore, according to a preferable aspect of the invention, color material of the chromatic color is used, in whole density regions, at an amount smaller than that of color material of the achromatic color. Thus, a color deviation, in which different colors from the intended ones are printed due to for example the characteristic of color material itself of an achromatic color and a relative color developing characteristic to a printing medium can be suppressed by using the above chromatic color so that the above chromatic color counter-balances the color deviation.

The above process can suppress the color deviation and thus print a favorable monochrome image.

The above and other objects, effects, features and advantages of the present invention will become more apparent from the following description of embodiments thereof taken in conjunction with the accompanying drawings.

DETAIL DESCRIPTION OF PREFERRED EMBODIMENTS

Hereinafter, embodiments of the present invention will be described in detail with reference to the drawings.

First Embodiment

Figure 1:
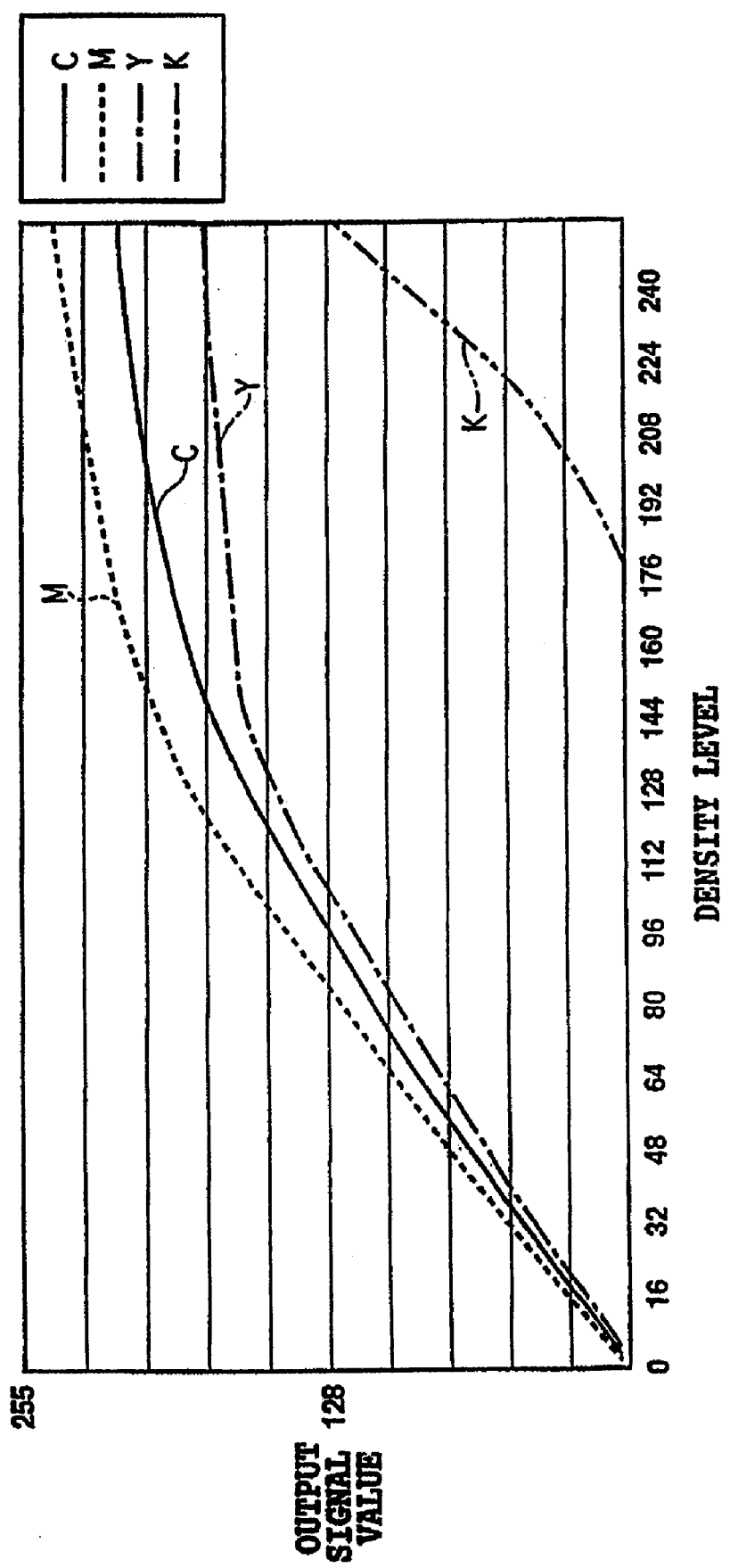
FIG. 1 shows the contents of a color conversion look-up table (LUT) when a conventional gray color image is printed.
Figure 3:
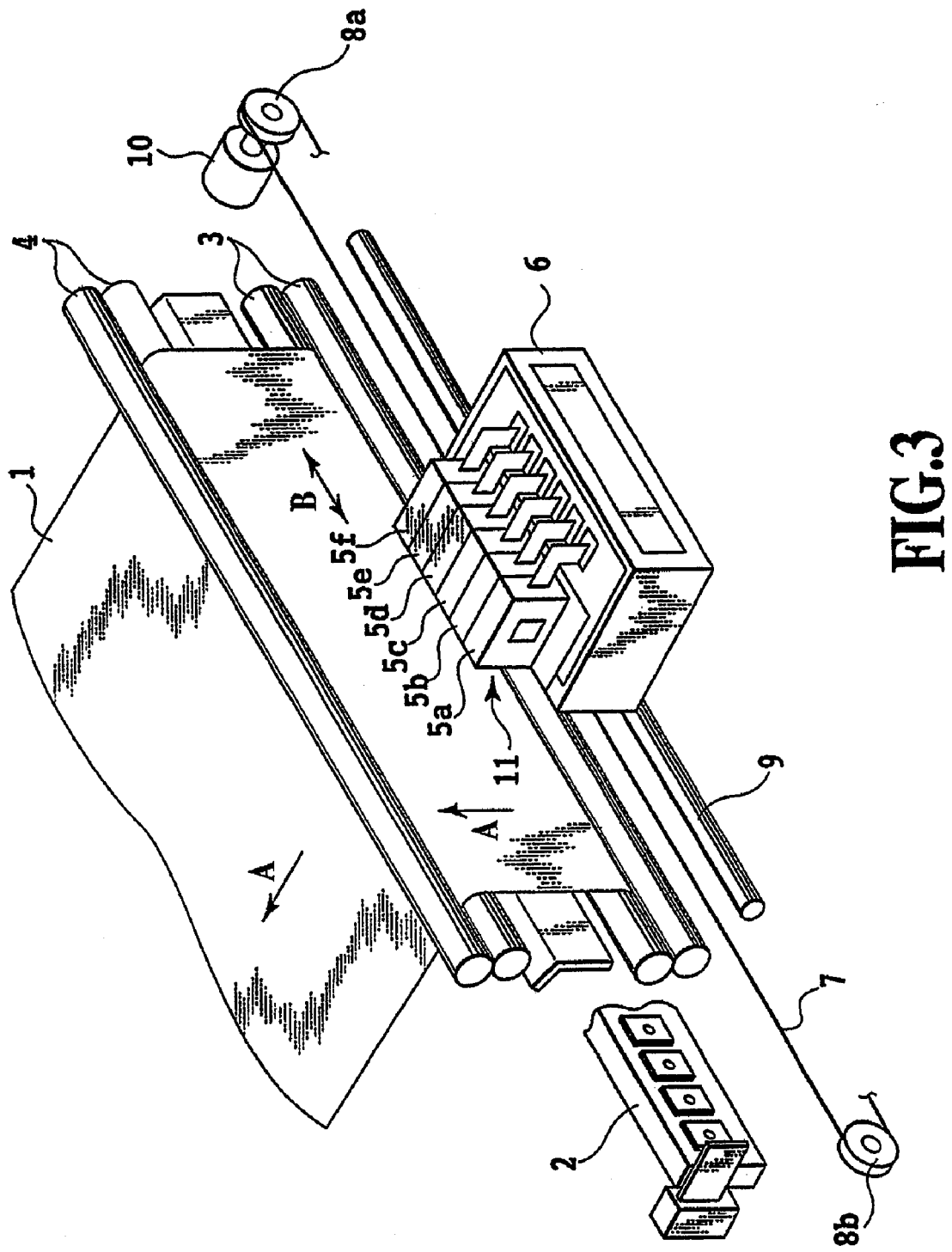
FIG. 3 is a perspective view illustrating the main structure of an ink jet printer according to one embodiment of the present invention.

FIG. 3 is a perspective view illustrating the main structure of an ink jet printer according to one embodiment of the present invention. In FIG. 1, a reference numeral 1 denotes a printing medium such as a paper, a plastic sheet. Before printing is started, the printing media 1 are layered in a cassette (not shown) or the like. When printing is started, the printing media 1 are fed one by one into a printer apparatus by a paper-feed roller (not shown). A reference numeral 3 denotes a first pair of transport rollers and a reference numeral 4 denotes a second pair of transport rollers, respectively. These pairs of rollers are arranged in a substantially vertical direction with a predetermined interval therebetween. The first pair of transport rollers 3 and the second pair of transport rollers 4 are rotated by driving force of the respective stepping motors (not shown) to intermittently transport, by a predetermined amount, the printing medium 1 sandwiched by these pairs of rollers in the direction of an arrow A.

Reference numerals 5a to 5f denote Ink tanks for storing ink supplied to respective corresponding printing heads 11. The ink tank 5a stores yellow ink (Y), the ink tank 5b stores magenta (M) ink, the ink tank 5c stores cyan (C) ink, the ink tank 5d stores light magenta (lm) ink, the ink tank 5e stores light cyan (lc) ink, and the ink tank 5f stores black (K) ink, respectively. Front sides of the respective ink tanks (printing medium side) are connected with the corresponding printing head 11 via an ink supply path. In this manner, an ejection opening face in which ink ejection openings of the printing head 11 are provided is opposed to the printing medium 1 sandwiched by the first pair of transport rollers 3 and the second pair of transport rollers 4 to have a given tension. It is noted that the printing heads 11 for ejecting the above six colors of ink may be independently provided for the respective colors or may be provided integrally.

The printing heads 11 and the ink tanks 5a to 5f are mounted in a carriage 6 in a detachable manner. A reference numeral 10 denotes a carriage motor that transmits the driving force thereof via two pulleys 8a and 8 and a belt 7 to the carriage 6, thereby reciprocating the carriage 6 in the direction shown by an arrow B. Then, the scanning direction of the carriage 6 is guided and supported by a guide shaft 9.

A reference numeral 2 denotes a recovery unit for performing a maintenance processing of the printing head 11. The printing heads 11 are moved, as required, to a home position at which the recovery unit 2 is provided to use the recovery unit 2 to perform the recovery processing such as a preliminary ejection, suction recovery, wiping or the like.

When printing is performed, the carriage 6 is moved in the direction shown by an arrow B during which the respective printing heads 11 eject ink droplets depending on a printing signal with an appropriate timing. When this one printing scan by the printing heads 11 is completed, the pair of transport rollers 3 and 4 transport the printing medium 1 by a predetermined amount. By repeating the printing scanning and the transport of the printing medium as described above, an image is formed on the printing medium 1 sequentially.

Figure 4:
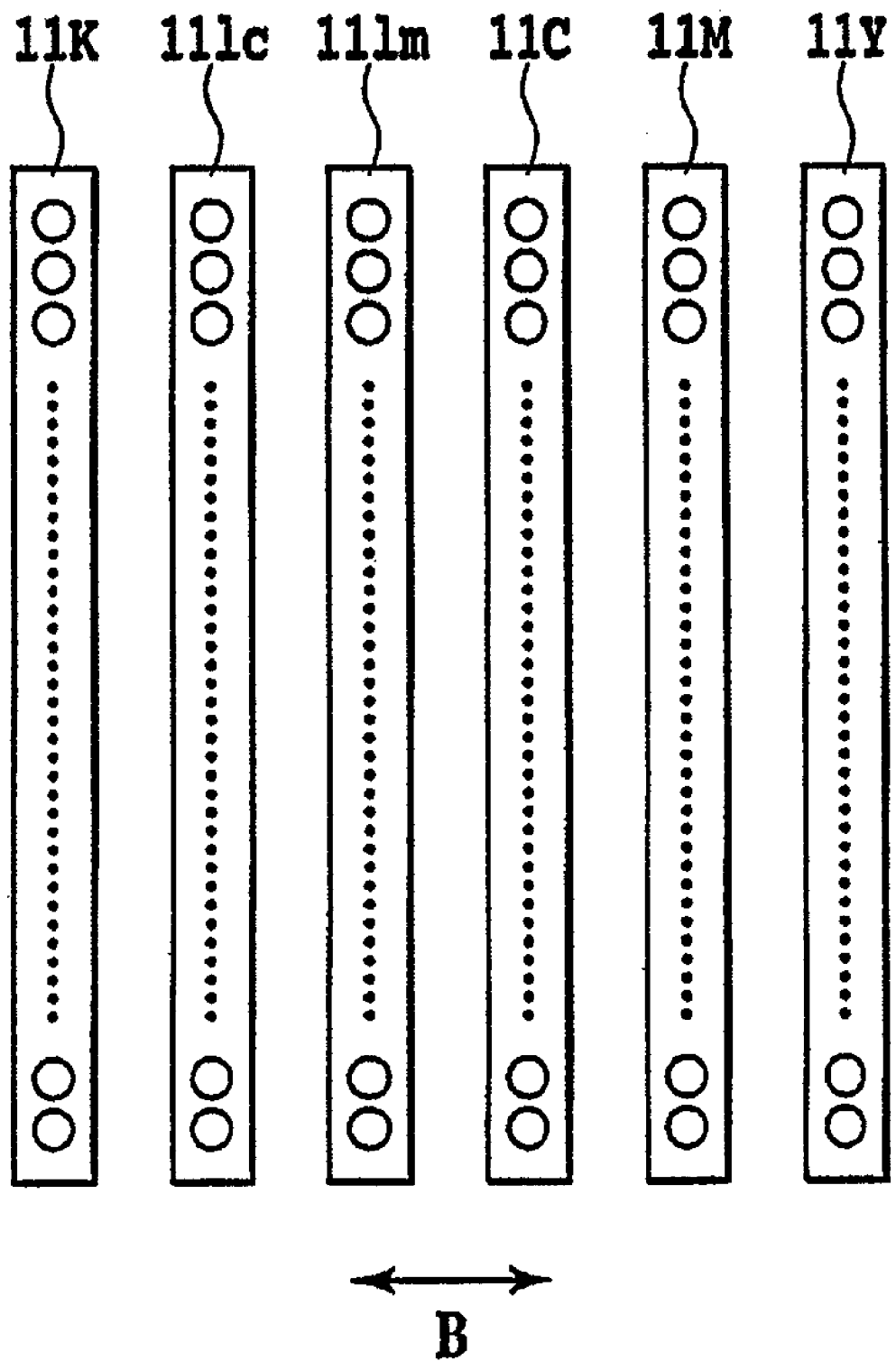
FIG. 4 is a schematic view illustrating ejection opening faces of printing heads of the respective Inks shown in FIG. 3.

FIG. 4 is a schematic view illustrating ejection opening faces of printing heads 11K, 111c, 111m, 11C, 11M, and 11Y of the respective inks. (the ejection opening rows of) the respective printing heads are arranged at the same position as that of the ink tank 5, as shown in FIG. 4, in the direction shown by the arrow B along which the printing scan is performed. In an ejection opening row of each ink, 512 ejection openings are arranged in the direction shown by the arrow A along which a printing medium is transported and with a pitch of about 40 μm. This allows, when the respective printing heads 11 provide one printing scan, the printing medium 1 to have thereon an image having a resolution of 600 dpi (dot/inch: reference value).

In this embodiment, an ejection opening of each printing head ejects an ink droplet of about 2 ng (2 Pl). In the printer of this embodiment, this ink amount of 2 ng is "an amount at which black ink applied on a printing medium in a discrete manner causes a granular quality but causes almost no problem in a general distance of distinct vision". It is noted that the present invention is not limitedly applied to the use of a minute ink droplet as described above. For example, it is clear that the present invention can be effectively applied regardless of an amount of ink droplets when suppression of color deviation is mainly required e.g., when a printed image having granular quality causes a small problem or when a user desires the suppression of color deviation and is not concerned about granular quality.

Figure 5:
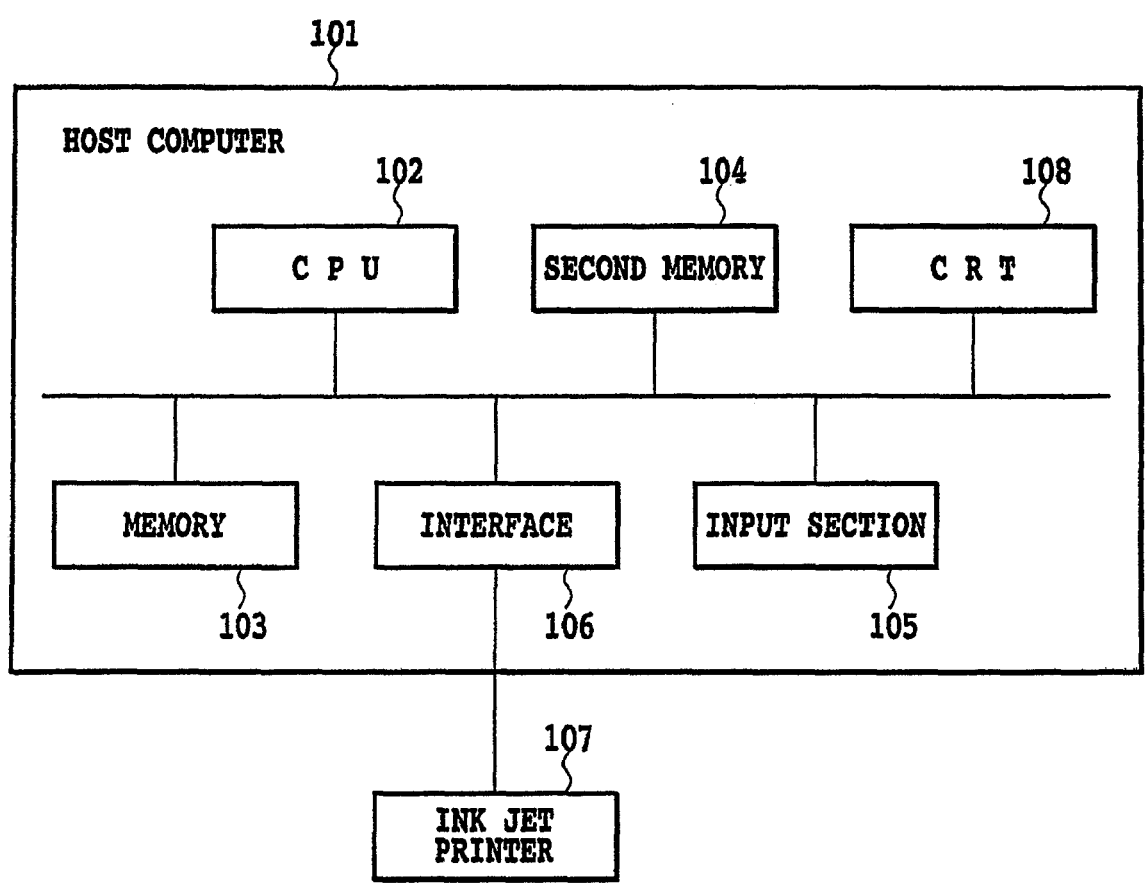
FIG. 5 is a block diagram illustrating a printing system of the embodiment structured to include the ink jet printer of the embodiment and a host computer for the printer.

FIG. 5 is a block diagram showing a printing system of this embodiment structured to include the ink jet printer of this embodiment as described above and a host computer for the printer.

A host computer 101 includes: a CPU 102, a memory 103, a second memory 104, an input section 105, a CRT 108, and an interface 106 for example.

The CPU 102 executes a program stored in the second memory 104 to perform an image processing which will be described later with reference to FIG. 6, FIG. 7 and FIG. 12 and overall processing involved with printing. The memory 103 is used as a work area for performing an image processing and as a temporary storage region for image data. A program for executing a processing for converting image data also may be supplied from an external apparatus (not shown) for example to the host computer 101. While confirming the CRT 108, a user uses the input section 105 to input various commands.

The host computer 101 is connected with an ink jet printer 107 via the interface 106. The CPU 102 sends print data processed through the image processing to the ink jet printer 107 to cause the ink jet printer 107 to perform printing operation.

Figure 6:
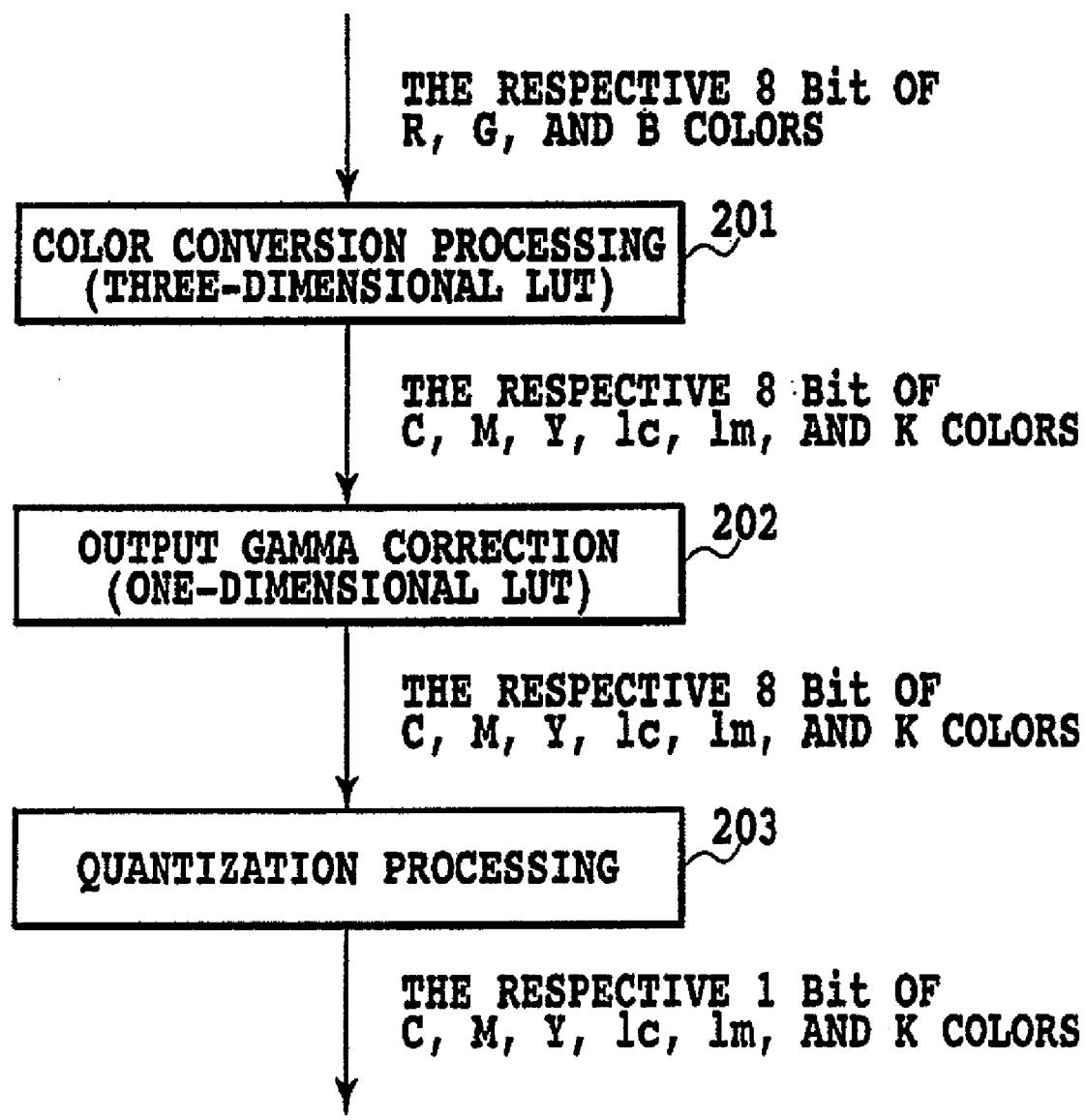
FIG. 6 is a block diagram for explaining an image processing performed by a CPU 102 shown in FIG. 5.

FIG. 6 is a block diagram for explaining an image processing performed by the CPU 102 shown in FIG. 5. In this embodiment, brightness signals of red (R), green (G), and blue (B) are used as color signals representative of an image. 8 bit (256 tones) image data represented by these brightness signals is finally converted to printing data of the respective 1 bit cyan (C), magenta (M), yellow (Y), light cyan (lc), light magenta (lm), and black (K) used in the ink jet printer. It is noted that the entire image processing corresponds to conversion processing by step S705 and step S709 which will be described later with reference to FIG. 7, or conversion processing by step S1205 and step S1210 which will be described later with reference to FIG. 12.

As shown in FIG. 6, the respective 8 bit brightness signals R, G, and B as color signals representative of an image are inputted to a color conversion processing section 201. Then these brightness signals R, G, and B are converted to 8 bit density signals of C, M, Y, lc, lm, and K. Here, the conversion is performed by using a three-dimensional color conversion look-up table (LUT) and an interpolation processing. Specifically, the CPU 102 refers to the LUT to calculate density values of the respective C, M, Y, lc, lm, and K corresponding to a combination of the inputted R, G, and B signal values. Here, the LUT stores only density values to specific discrete R, G, and B data. Thus, the interpolation processing is performed by using the combinations of a plurality of density values, which are stored to correspond to combinations of R, G, and B expressed by 256 levels for each color, to calculate the combinations of density values corresponding to the combinations of input R, G, and B values. It is noted that the interpolation processing performed here is a known technique and thus will not be described further. A density signal value obtained by the color conversion processing 201 is represented by 8 bit as in the case of an input value and is outputted as image data having tone values (density values) of 256 levels.

Next, the image data that has been subjected to the color conversion processing 201 is subjected to the conversion processing by the output gamma (γ) correction 202. The output gamma correction section 202 corrects the data for each ink color so that the optical density finally expressed on a printing medium can have linearity to an inputted density signal. Here, the gamma correction is performed by referring to one-dimensional look-up tables independently prepared for the respective colors. The output signal from the output gamma correction 202 is 8 bit density value data as in the case of the input value.

Next, the 8 bit density value data outputted from the output gamma correction 202 is subjected to a quantization processing 203. In the ink jet printer of this embodiment, each of ink droplets ejected from the printing head is 2 ng. Thus, the densities of the respective pixels on a printing medium are represented at two levels that are determined according to whether a 2 ng ink droplet is applied or not. In an area having a size which is formed by a group of a plurality of pixels, the density is shown in a macroscopic manner by the number of pixels in which ink dots are formed. The method for representing the density as described above is generally called as an area coverage modulation method. A printing apparatus using the area coverage modulation method requires a quantization processing for converting multiple value data to binary data as in this embodiment. The quantization processing may be performed by several methods and can be performed by known error diffusion method or dither method. The binary image data represented by 1 bit for each color quantized by the quantization processing 203 is transferred to the ink jet printer and a printing operation is performed.

An optimal conversion method in the color conversion processing 201, the output gamma correction 202, and the quantization processing 203 as described above is generally different depending on the type of a printing medium or the type of an image to be printed for example. In particular, look-up tables used by the color conversion processing 201 and the output gamma correction 202 are generally prepared for the respective types of printing media.

Figure 7:
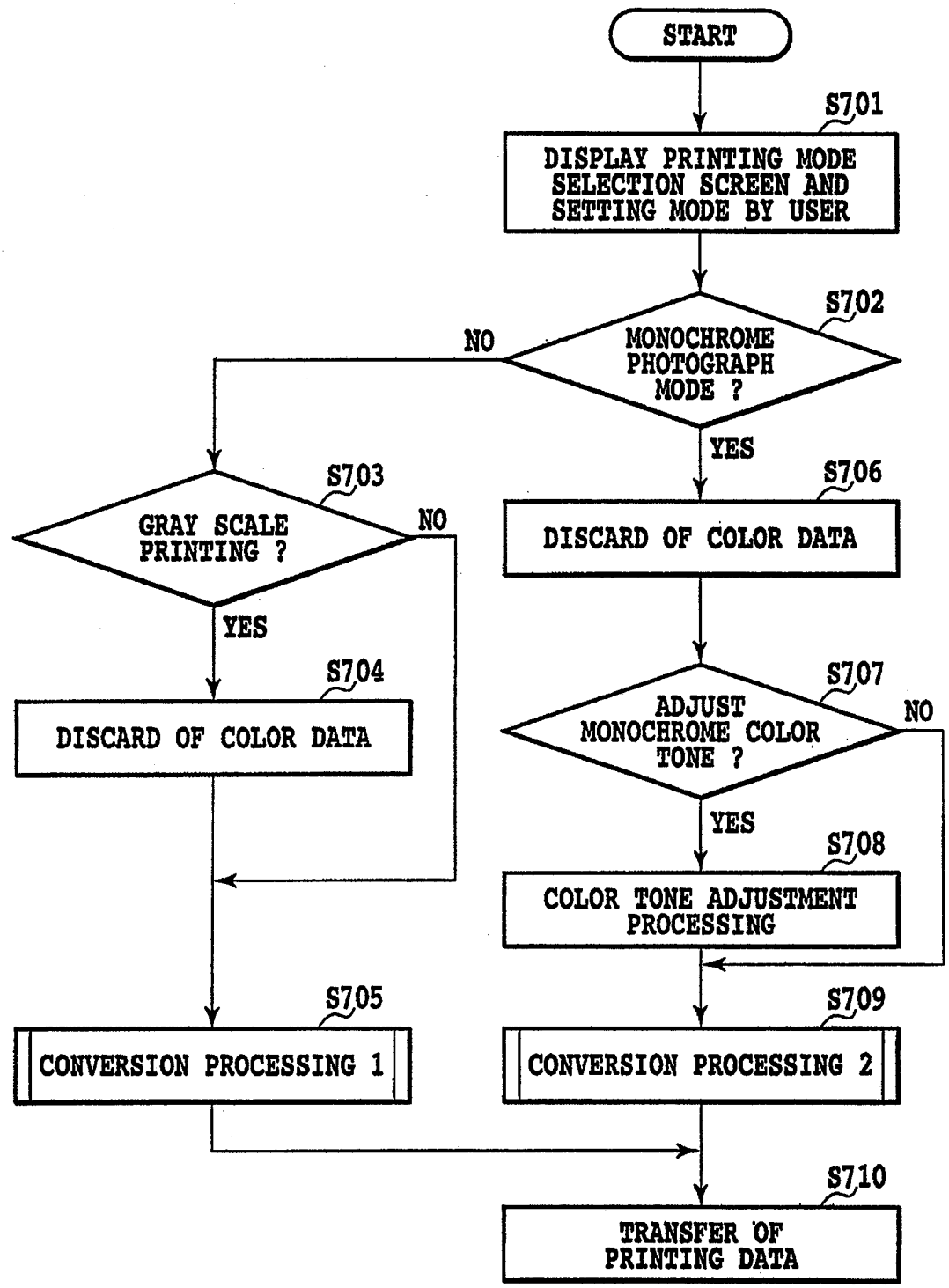
FIG. 7 is a flowchart illustrating an image processing by a host computer 101 and related processing, including a color conversion processing for determining an ink amount in the case of a monochrome printing according to a first embodiment of the present invention.

FIG. 7 is a flowchart showing an image processing by the host computer 101 and related processing, including a color conversion processing for determining an ink amount in the case of the monochrome printing according to a first embodiment of the present invention.

This processing is started when a user instructs a printing operation via an application. First, the CPU 102 causes the CRT 108 to display a screen through which a print mode is selected (step S701).

Figure 8:
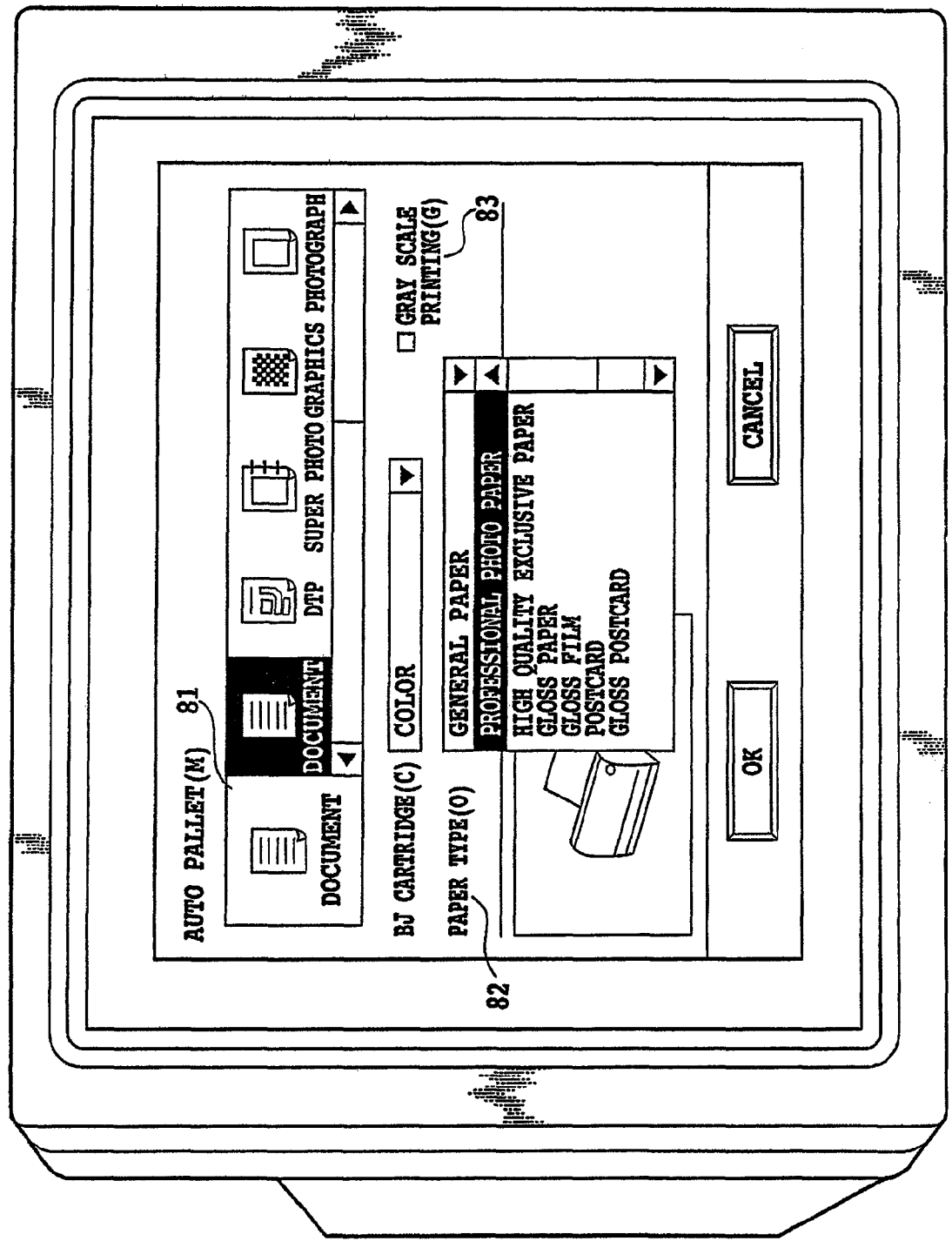
FIG. 8 is a view showing an example of a display screen of a CRT 108 for selecting a print mode in the processing of FIG. 7.

FIG. 8 shows an example of this display screen. The ink jet printer of this embodiment can provide printing for a plurality of types of printing media and has appropriate printing modes depending on the respective printing media. This setting or selection of the printing mode is performed by allowing a user to input several conditions via the screen shown in FIG. 8. In this embodiment, an auto pallet 81 is used to set the type of an image to be printed (e.g., document or photograph). Furthermore, a paper type 82 is used to set the type of a printing medium to be printed. Furthermore, a monochrome mode for printing a desired monochrome image can be set by checking a checkbox in a gray scale printing 83.

Referring to FIG. 7 again, the subsequent step S702 determines whether the set printing mode is a monochrome photograph mode or not. In this embodiment, this "monochrome photograph mode" is set when the checkbox 83 is used to select the gray scale printing and when the paper type 82 is used to select a professional photo paper. When the checkbox 83 is used to select a gray scale printing and the paper type 82 is used to select the types other than the professional photo paper, then a normal monochrome mode (gray scale printing) other than "monochrome photograph mode" is set.

When step S702 determines that the set print mode is the monochrome photograph mode, the processing proceeds to step S706. Step S706 performs a processing for discarding color components of color signals representing the monochrome image, specifically color information represented by R, G, and B. More specifically, R, G, and B signals of the image data, which are signals representing the image, are converted to brightness signals of gray tone (R=G=B). This conversion is performed by using, when assuming that a brightness signal value of an achromatic color to be found is L, a conversion expression of L=0.3 R+0.6 G+0.1 B to substitute R, G, and B and replacing signals R, G, and B by L. This processing provides the discard of color information (color component) considering a certain level of luminance. After discarding of the color components at step S706, the processing proceeds step S707.

Step S707 determines, for a monochrome photograph image, whether color adjustment for providing a cold tone or a warm tone is performed or not. This is determined by confirming whether the checkbox in a setting screen of "monochrome photograph color tone adjustment" shown in FIG. 11 is checked or not.

Figure 11:
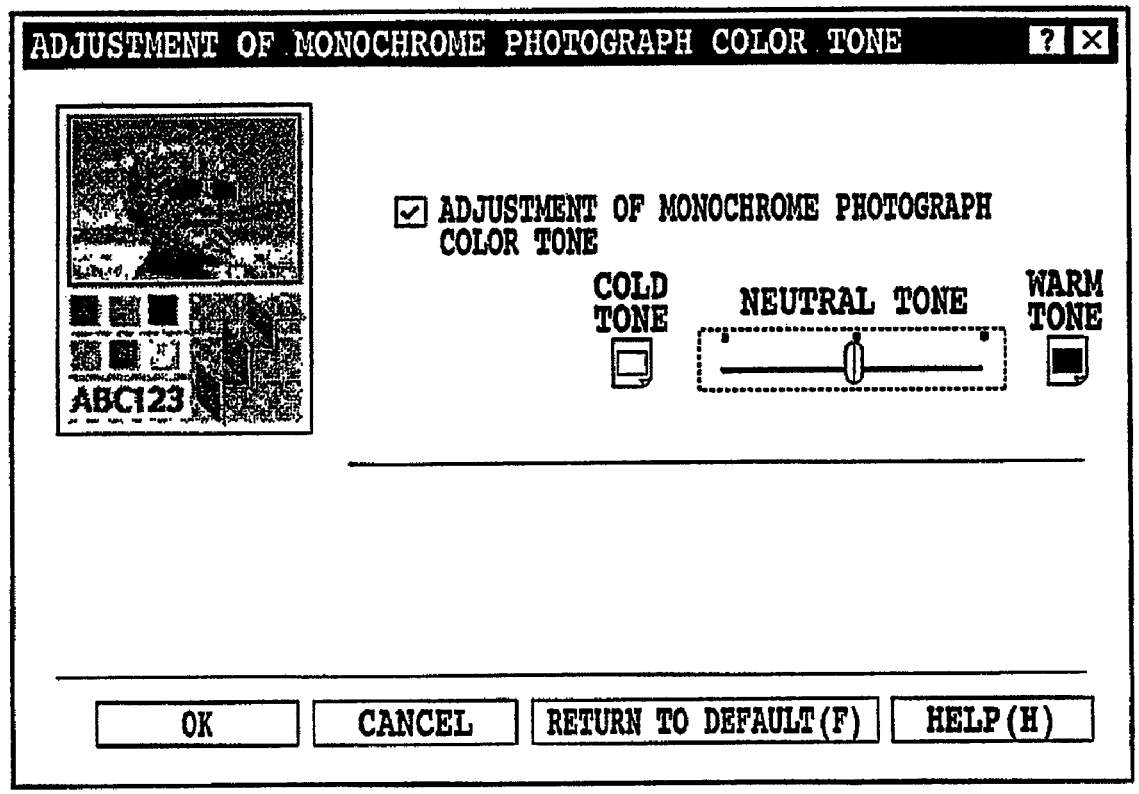
FIG. 11 is a view showing a screen of "monochrome photograph color tone adjustment" according to the first embodiment.

When it is determined that the color tone adjustment processing is to be performed, then step S708 adjusts the color tone in accordance with a slide amount of a slider shown in FIG. 11. Specifically, in the case of a warm tone, the value L obtained in step S706 is used to adjust the color tone based on a formula (1) as shown below.

$$R = \mathrm{INT}(255 \times (L/255)^{1/(1-m)})$$

$$G = \mathrm{INT}(255 \times (L/255)^{1/(1+m)})$$

$$B = \mathrm{INT}(255 \times (L/255)^{(1+m)}) \quad (1)$$

In the above formula, "m" denotes a tone adjustment coefficient corresponding to the slide amount of the above slider operated by a user, and is adjusted, for example, within a range of 0<m<0.5. As a result, the image data is adjusted to be data showing a relation that the respective values of R and G are greater than the value of B. That is, data of R, G and B that has been adjusted to be the warm tone has a relation R=G>B.

In the case of the cold tone on the other hand, the color tone is adjusted based on a formula (2) as shown below.

$$R = \mathrm{INT}(255 \times (L/255)^{(1-m)})$$

$$G = \mathrm{INT}(255 \times (L/255)^{(1-m)})$$

$$B = \mathrm{INT}(255 \times (L/255)^{1/(1-m)}) \quad (2)$$

In the above formula, "m" denotes the tone adjustment coefficient corresponding to the slide amount as described above and is adjusted, for example, within a range of −0.5<m<0. As a result, the image data is adjusted to be data having a relation that the value of B is greater than the respective values of R and G. That is, data of R, G and B that has been adjusted to be the cold tone has a relation B>R=G.

Addition

By the way, the above-described adjustment for a warm tone and a cold tone may be performed by a one-dimensional look-up table (LUT). For example, one-dimensional LUTs are prepared for respective setting levels for a warm tone or a cold tone and a LUT corresponding to the set level is used to execute conversion of R, G, and B signal values. In this case, however, one-dimensional LUTs are required to be prepared to the number obtained by summing up warm tone setting levels and cold tone setting levels, causing a system for the color adjustment to be large scale and complicated. This also requires, when a sepia tone, a violet tone, or a cyan tone for example is required for a special application other than those for a warm tone and a cold tone, another one-dimensional LUT to be prepared for the application.

On the contrary, according to the embodiment of the present invention, the R, G, and B signals obtained by the adjustment for the warm tone and the cold tone as described above are converted to color material amount signals by using a single three-dimensional LUT that assumes the R, G and B signals as an input, which will be described later with reference to FIGS. 9A-9G and FIG. 10. This eliminates the above conventional need for preparing LUTs to the number of setting levels. In other words, according to the embodiment of the present invention, the color adjustments for the warm tone and the cold tone are performed as in the same manner as that in general color conversion as a color adjustment. Accordingly, even in the case of a sepia tone and so on for a special application, color adjustments for these special tones can be performed by using a single LUT, as long as executing a processing for obtaining corresponding R, G, and B signals to the special tones. Then, the single LUT can effectively decrease the color deviation for the color adjustment.

Referring to FIG. 7 again, subsequent to this color adjustment of step S708 is performed, then the processing proceeds to step S709. If step S707 determines not to perform the color adjustment, the processing directly proceeds to step S709. Step S709 executes conversion processing 2 unique to the monochrome photograph mode. Specifically, when the color adjustment processing of Step S708 is performed, the color signals (R, G, and B signals) adjusted based on the above two formulae are converted thorough conversion processing 2 to signals corresponding to color materials (C, M, Y, K, lc, lm). On the other hand, when the color adjustment processing of Step S708 is not performed, the color signals having the value of L (that is L=R=G=B) obtained at step S706 are converted thorough conversion processing 2 to signals of color materials (C, M, Y, K, lc, lm).

The conversion processing 2 includes the color conversion processing 201 described as referring to FIG. 6. The color conversion processing 201 uses a three dimensional look-up table exclusive for a monochrome photograph mode to determine uses of inks, which will be described later with reference to FIG. 9A-9G. As a result, a monochrome photograph-tone image free from color deviation can be printed. Specifically, this color conversion processing generates signals corresponding to use amounts of black ink and other colors of inks so that the black ink is used in a greater amount than those of the other colors of inks in whole density regions (whole density ranges) ranging from a low density region to a high density region, in every regions of a color reproduction region (color gamut) according to this color conversion processing or in every hues as well as the entire achromatic axis (gray axis).

It is noted that the conversion processing 2 includes a series of image processing steps (color conversion processing 201, output gamma correction 202, quantization 203) described with reference to FIG. 6 as described above. Accordingly, the processing of step S709 converts density signals of 8 bit obtained by the color conversion processing 201 to binary print data of 1 bit through the output gamma correction 202 and the quantization process 203.

Referring to FIG. 7 again, when Step S702 determines that the mode is not the monochrome photograph mode, the processing proceeds to step S703 to determine whether a monochrome mode other than "monochrome photograph mode" is set or not. Specifically, as described for step S702, whether the checkbox 83 of "gray scale printing" in the user interface screen shown in FIG. 8 is checked or not is determined. When it is detected that the checkbox 83 is checked, the processing proceeds to step S704 to convert, as in the processing of step S706, the R, G, and B image signals to brightness signals of gray tone (R=G=B). Then, the processing proceeds to step S705. When it is determined that the checkbox 83 of the gray scale printing is not checked on the other hand and is thus determined that a color mode is set, the processing directly proceeds to step S705.

Figure 2:
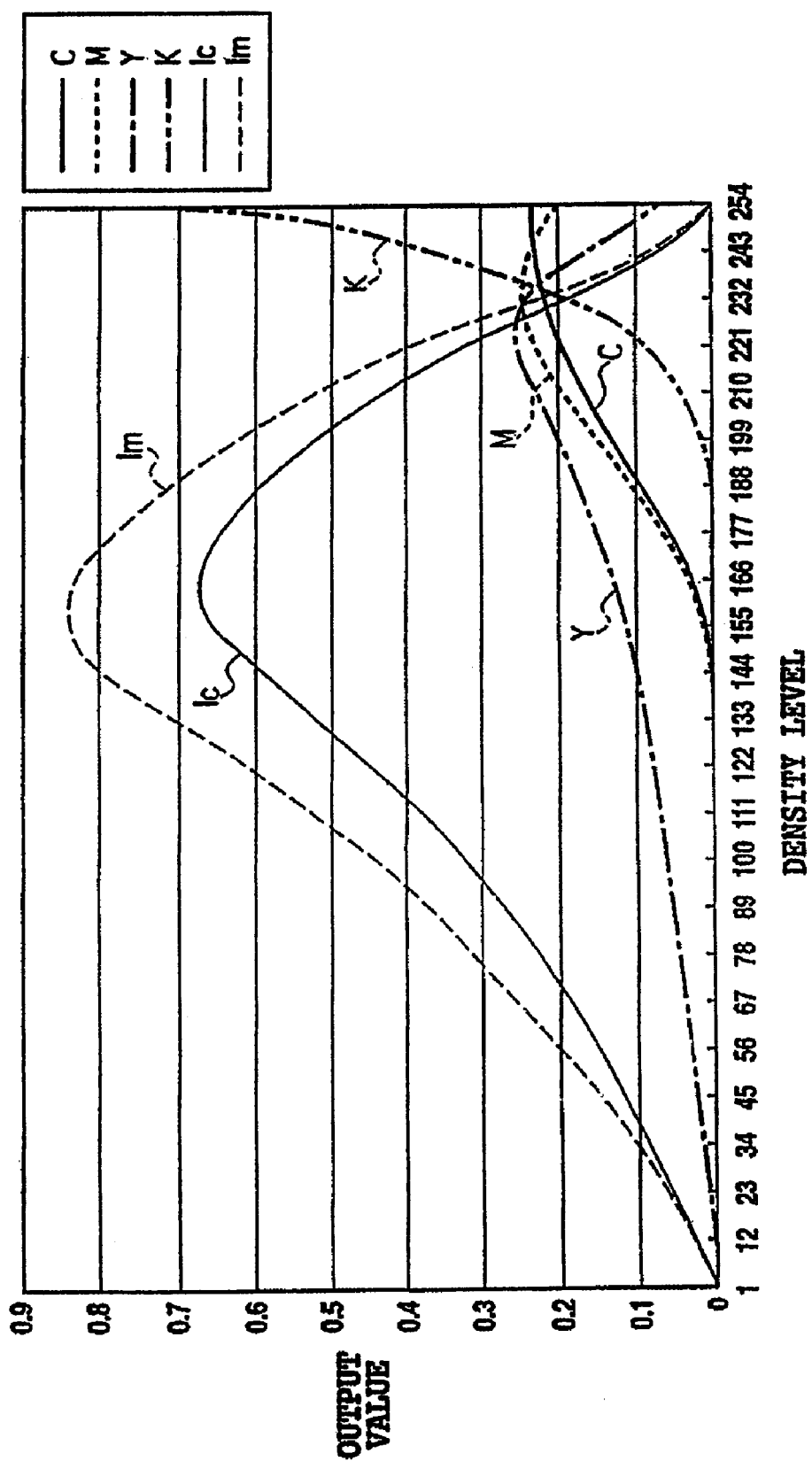
FIG. 2 shows another example of a conventional color conversion LUT.

Step S705 performs a conversion processing 1 for the image data. The conversion processing 1 also includes, as in the conversion processing 2, the series of image processing steps (201, 202, 203) described for FIG. 6. However, the conversion processing 1 has a color conversion processing 201 different from that of the conversion processing 2. Specifically, when the processing directly goes to step S705 without going through step S704, then the conversion processing 1 uses a known color conversion processing table for a color mode to generate density value signals corresponding to the respective colors of inks required for printing a color image. It is noted that in the color conversion processing table for the color mode, black ink is not used in every hues of a color reproduction region (color gamut) including a gray axis and hues other than the gray axis but is only used in a part of the color reproduction region (specifically in the gray axis and neighborhood thereof). Also, when the processing reaches step S705 via step S704, the conversion processing 1 similarly uses the above-described color conversion processing table for the color mode. However, since the color data (color component) has been discarded, density value signals corresponding to the respective colors of inks required to print a gray scale image are generated. This generation process includes the color conversion of gray axis as shown in FIG. 2. Further in step S705, respective 8 bit of density signals corresponding to respective colors of ink obtained by the color conversion processing 201 are converted to binary print data represented by 1 bit for each of colors, through an output gamma correction processing 202 and a quantization processing 203.

The image data subjected to the conversion processing of step S705 or step S709 is sent to the ink jet printer 107 (Step S710). The ink jet printer performs a printing operation to a printing medium based on thus sent binary print data.

In this embodiment, the monochrome photograph mode is set only when a printing medium is a professional photo paper. Thus, the conversion processing 2 provided in the step S709 uses a processing method exclusive for the professional photo paper. When it is determined that the mode is not a monochrome photograph mode, the conversion processing 1 provided in the Step S705 can handle a plurality of types of printing media. Specifically, different look-up tables are prepared for various types of printing media regarding the color conversion processing and the output gamma correction. Thus, the conversion processing 1 provides conversion suitable for each type of printing medium. The processing here has been described, in order to make comparison between the monochrome photograph mode and those other than the monochrome photograph mode, as the one branching to two processing's as shown in FIG. 7.

Figure 9A:
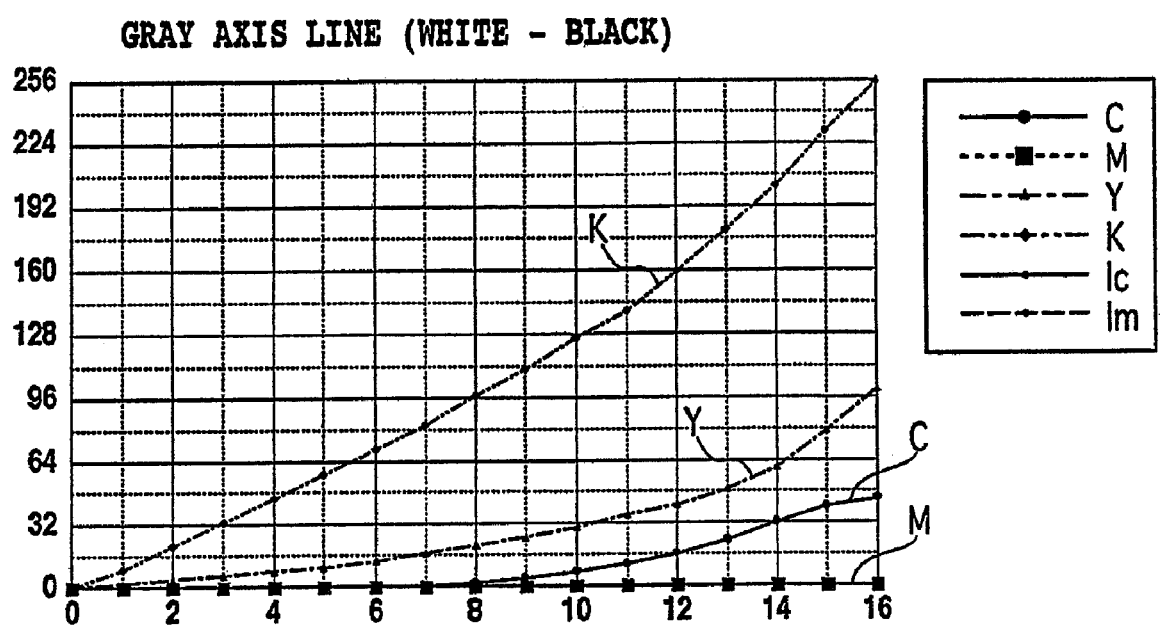
FIGS. 9A-9G are diagrams schematically showing look-up tables (LUT) used in the post process of the color conversion processing in a conversion processing 2 in processing of FIG. 7.
Figure 9B:
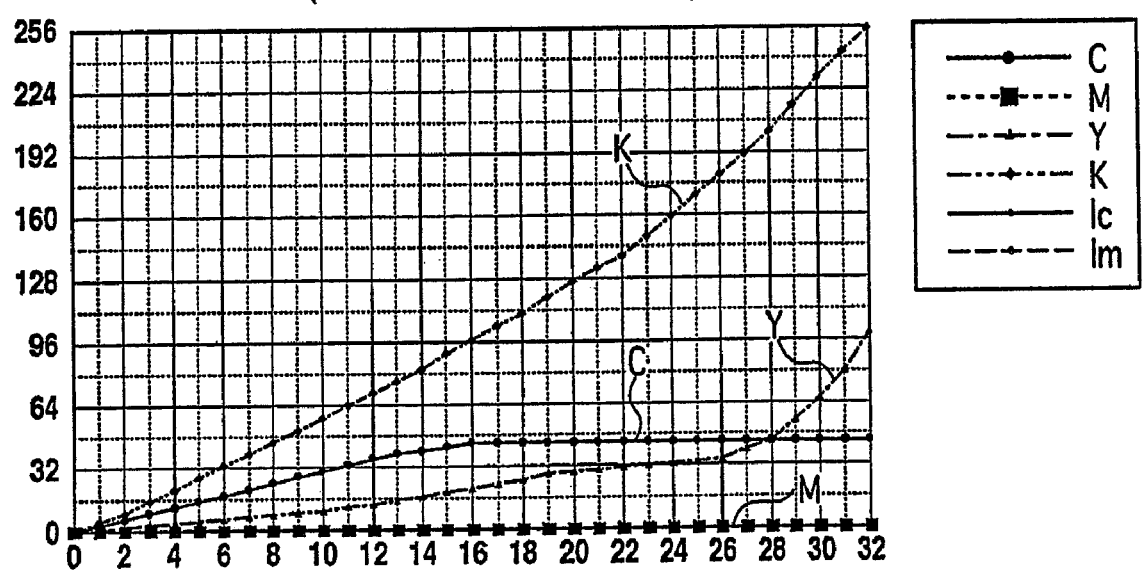
Figure 9C:
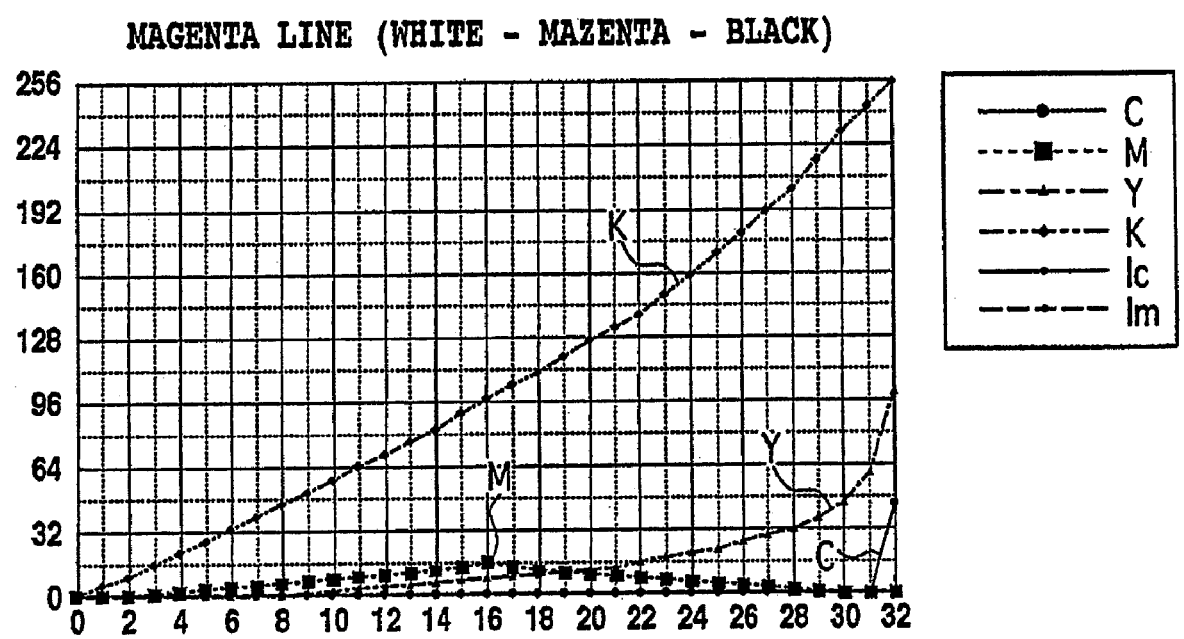
Figure 9D:
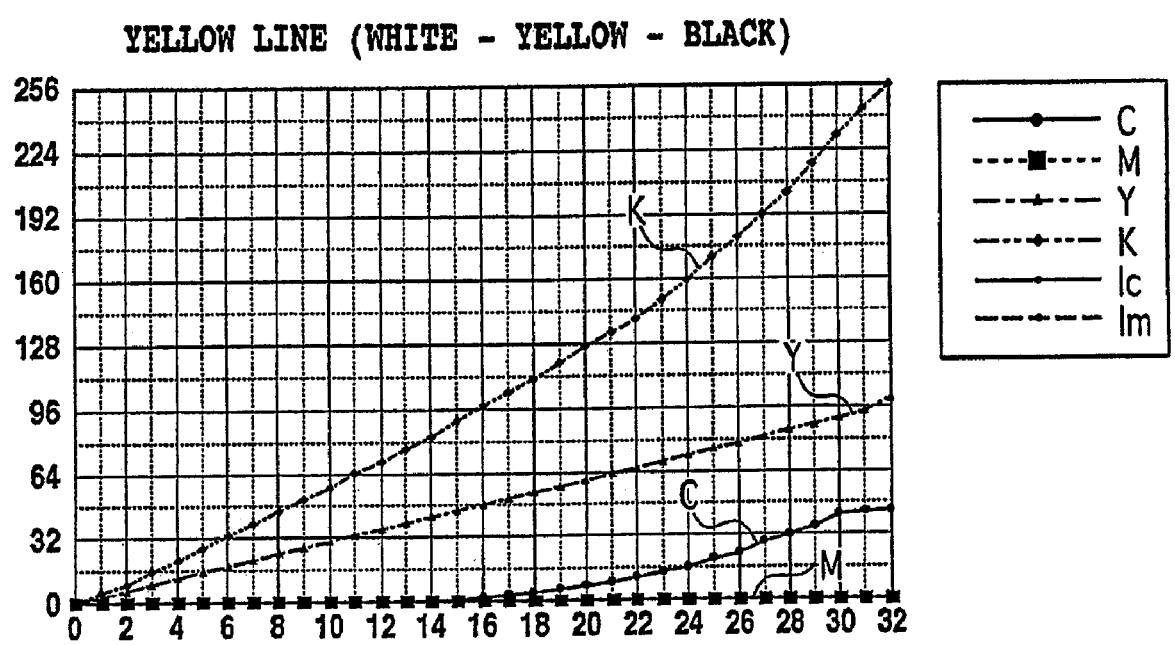
Figure 9E:
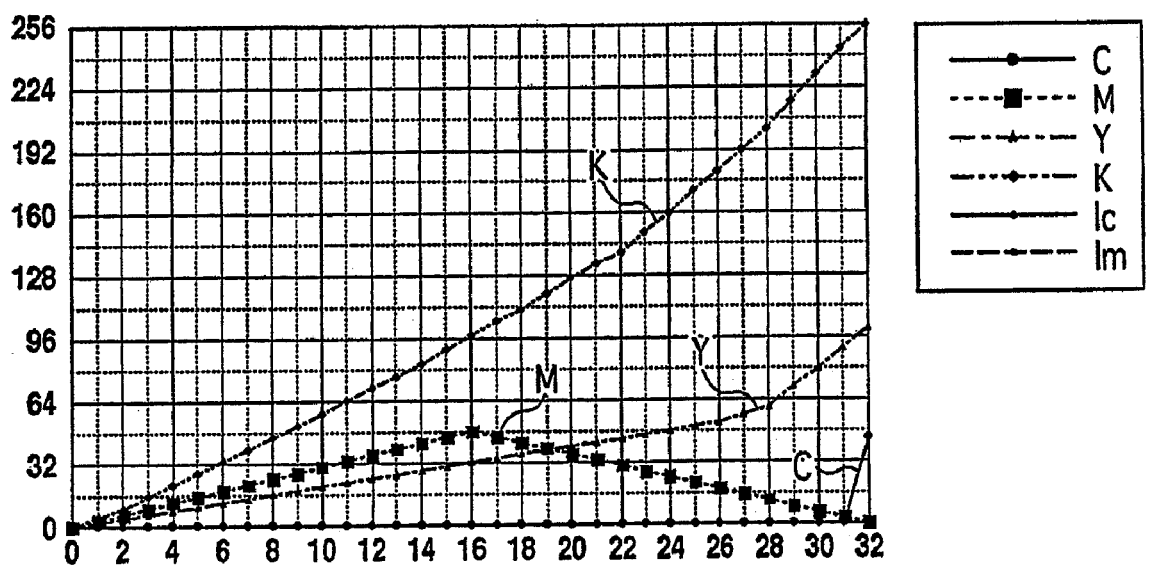
Figure 9F:
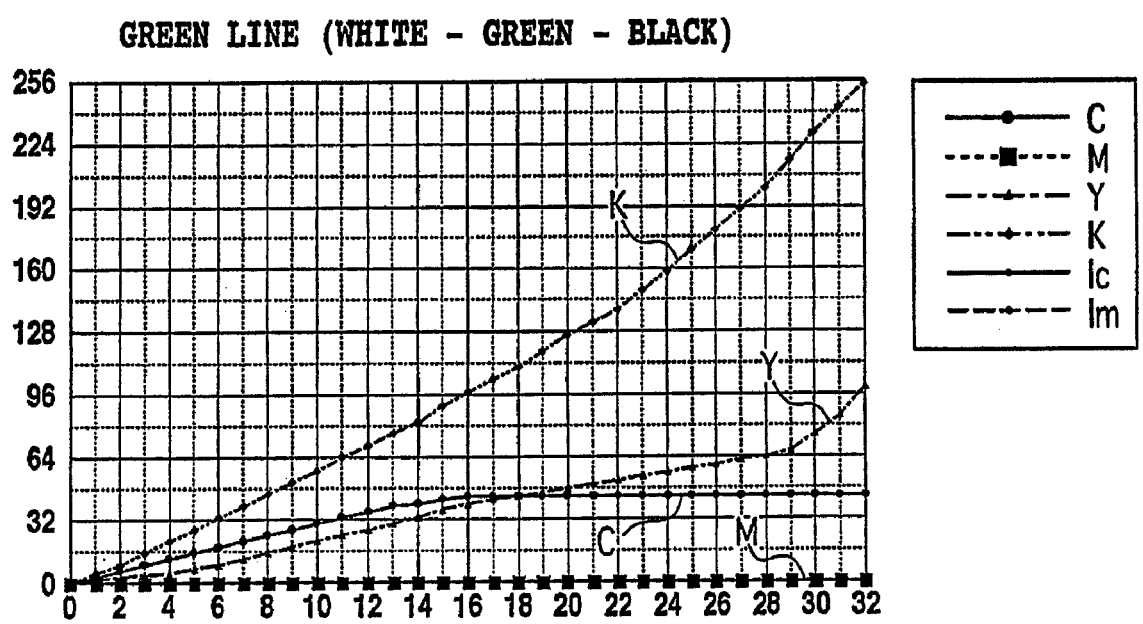
Figure 9G:
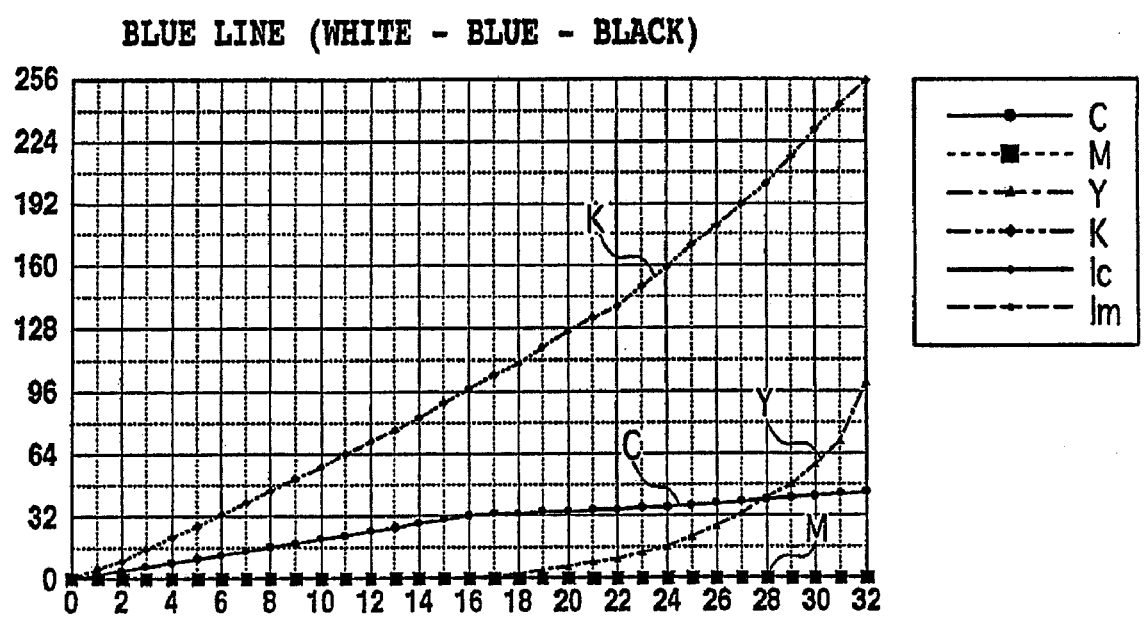

FIGS. 9A-9G schematically illustrate a look-up table (LUT) used in the color conversion processing 201 in the conversion processing 2. FIGS. 9A to 9G show a gray axis line table, a cyan line table, a magenta line table, a yellow line table, a red line table, a green line table, and a blue line table, respectively. In each figure, a horizontal axis denotes lattice points on each line of the LUT. These lattice points are defined by the R, G and B signal values described above. A vertical axis denotes density values of C, M, Y, K, lc and lm corresponding to the lattice points. That is, the vertical axis denotes respective ink amounts used to express the color of (the lattice point of) of the lines. The gray axis line of the table shown in FIG. 9A is a line in the LUT for connecting a lattice point of white with a lattice point of black. The cyan line of the table shown in FIG. 9B is a line passing through the above white lattice point via cyan lattice point to the black lattice point and passes a lattice point of the maximum chroma of cyan hue in the color reproduction region (color gamut). The lines of the tables shown in FIG. 9C to 9G are also those similar to the cyan line that passes the maximum chroma points of the respective hues. It is noted that ink amount (of the lattice points) on the shown lines is obtained, for example, by the colorimetry result of a printed patch and ink amount of a lattice point on a line other than these lines is determined by an interpolation processing.

Figure 10:
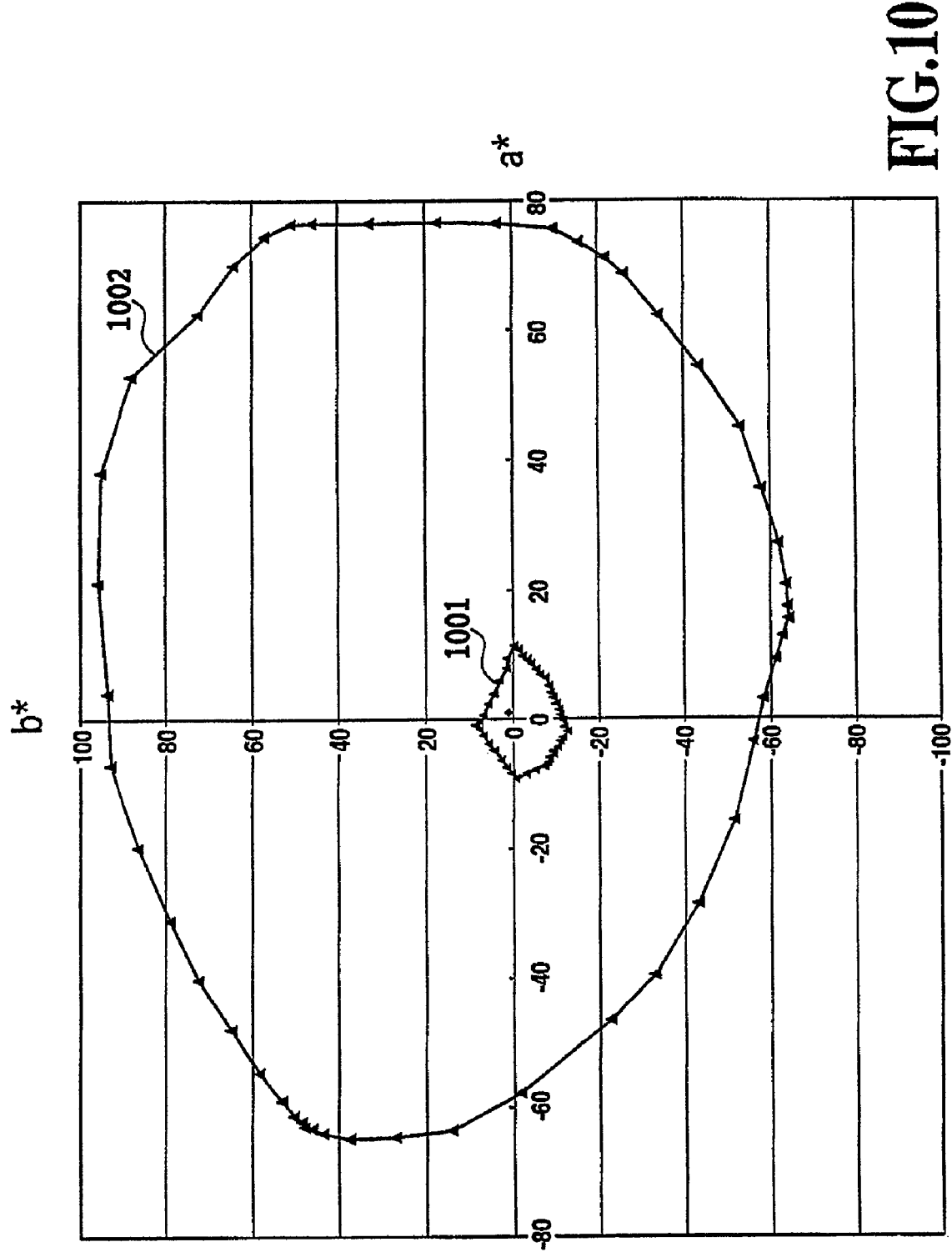
FIG. 10 is a diagram showing a gamut according to the first embodiment compared with a gamut in the case of color printing.

The lines on the LUT of this embodiment, which are the tables shown in FIG. 9A-9G, are lines that are in a color reproduction region (color gamut) smaller than a color reproduction region in the case of the conversion processing 1 as shown in FIG. 10, and are significantly different from the table of the conversion processing 1 with regards to the way to use inks. Specifically, even when the color tone adjustment of step S708 is performed in the monochrome photograph mode, the monochrome image is an image of basically gray or black and a color reproduction region is a small gamut in which a periphery of the gray axis has not so much large (high) chroma. FIG. 10 is a diagram showing a gamut 1001 of this embodiment seen from the above part of the luminance (L*) axis that is compared with a gamut 1002 in the case of color printing. As shown in FIG. 10, the gamut 1001 has a relatively small chroma value (a*, b*) compared to that of the gamut 1002.

As a first feature, the LUT of this embodiment shown in FIGS. 9A to 9G uses black ink in whole density ranges from a low density to a high density in each of a gray axis and respective hues, which are in a color reproduction region (gamut 1001 show in FIG. 10) including the gray axis (FIG. 9A) and regions (FIGS. 9B to 9G) other than the gray axis. The black ink maintains, in whole density ranges, higher output values than those of other color inks. This black ink amount increases monotonically. By using black ink in whole density regions defined by image data in order to print a monochrome image as described above, the use of C, M, and Y to express a monochrome image can be avoided, thus decreasing the color deviation due to slight imbalance in ink amount among these three colors. In other words, a chromatic color ink is used together with black ink even in a low density region. In this case, these chromatic color inks do not have a role to reduce granular quality or a role as basic colors to form gray while having balance there among. Thus, even when a density value changes, the output value of the chromatic color only increases monotonically. Thus, they are prevented from crossing one another and concern that the color deviation may be caused as the conventional monochrome mode described with reference to FIGS. 1 and 2 is almost eliminated. It is noted that, although black ink here exemplarily has a curve at which the brightness γ≈1.8, the value of the brightness γ is not limited to this.

As a second feature, the LUT of this embodiment uses at least one chromatic color ink in addition to black ink in the respective regions. FIG. 9A-9G shows examples that two chromatic color inks of cyan and yellow or two chromatic color inks of magenta and yellow are used. It is noted that in a narrow part of the darkest part, three colors are used. These chromatic colors maintain the output values thereof at low levels. Specifically, a chromatic color used in this embodiment is used to express the hue of the region, e.g. the hue of cyan of the cyan line shown in FIG. 9B and is used to suppress the color deviation due to the characteristic of black ink itself used in that region or a relative characteristic of black ink with a printing medium. For example, if the characteristic of black ink or the relative characteristic is bluish gray or bluish black, then a chromatic color for counterbalancing this to prevent the bluish color from coming out is used. This also applies to the gray axis shown in FIG. 9A. In the examples shown in FIGS. 9A to 9G, at least one type of chromatic color ink (yellow ink, cyan ink or magenta ink in this example) among two types of chromatic color inks (cyan ink and yellow ink or magenta ink and yellow ink depending on a region) is used, as with black ink, in whole density regions from a low density region to a high density region, and other chromatic color Ink (cyan ink or yellow ink depending on a region) is used starting from the intermediate density region. By using at least one type of chromatic color ink together with black ink, the color deviation due to the characteristic of black ink can be suppressed when a monochrome photograph image is printed.

Compared to this, the conventional color conversion tables shown in FIG. 1 and FIG. 2 shows the increase or decrease of signal values that is not monotonic and cause the respective colors to cross one another at some points. This kind of condition causes a situation where the color deviation tends to be caused. When a printing head having a small ejection amount of ink is used as in this embodiment in particular, the color deviation appears more conspicuously, which is an adverse image effect for a case where a stable monotone image is required as the monochrome photograph mode.

The use of black ink from a low density region may deteriorate the granular quality. However, when an amount of discharged ink per one dot is sufficiently small and very few dots are visually found with a distance of distinct vision as in this embodiment, "color deviation" rather than granular quality is an adverse image effect, as described above. The present inventors focused attention on the fact that, when a photograph image having a high quality is desired to be realized, the level of an adverse image effect such as "granular quality" and "color deviation" changes depending on an amount of to-be-used ink droplets. The present inventors determined that, if the size of dots on a printing medium is sufficiently small to cause no problem, the suppression of "color deviation" is more important than the suppression of granular quality. Furthermore, the above concept is applied to parts other than the gray axis in a gamut. This can suppress "color deviation" even when a color tone adjustment function is included, thus providing a monochrome photograph having high quality.

The size or conspicuousness level of dots formed on a printing medium change depending on the color or characteristic of the printing medium. Thus, "what amount of discharged ink can prevent granular quality from being conspicuous" does not have a single clear answer. However, judging from generally-provided ink jet printers and printing media adaptable to the printers, an amount of ink of 5 ng or less per one dot causes almost no problem and the amount is more preferably 2 ng or less.

Modified Example

The above example has described an example where, only when an image to be printed is assumed to be a photograph image, i.e. only when a gray scale printing is selected and a professional photo paper is selected as a printing medium, the conversion processing 2 according to one embodiment of the present invention is performed. However, this embodiment is not limited to this example. For example, another configuration may be used where, even when an image to be printed is not a photograph image, the conversion processing 2 is performed if the gray scale printing is selected. That is, a configuration may be used in which, regardless of whether an image to be printed is a photograph image or not, the conversion processing 2 is performed when the monochrome mode for outputting the image by the gray scale is selected. This configuration can suppress color deviation not only when an image to be outputted is a monochrome photograph image but also in the entire gray scale image.

Addition

Second Embodiment

A second embodiment of the present invention is almost the same as the first embodiment as described above but is significantly different from the first embodiment in an operation by a user for the color adjustment in a monochrome photograph mode and a configuration for obtaining an adjusted value depending on the color adjustment. Hereinafter, these differences between the second embodiment and the first embodiment will be mainly described. It is noted that the second embodiment is based on the same printing system as those shown in FIG. 3 to FIG. 6.

Figure 12:
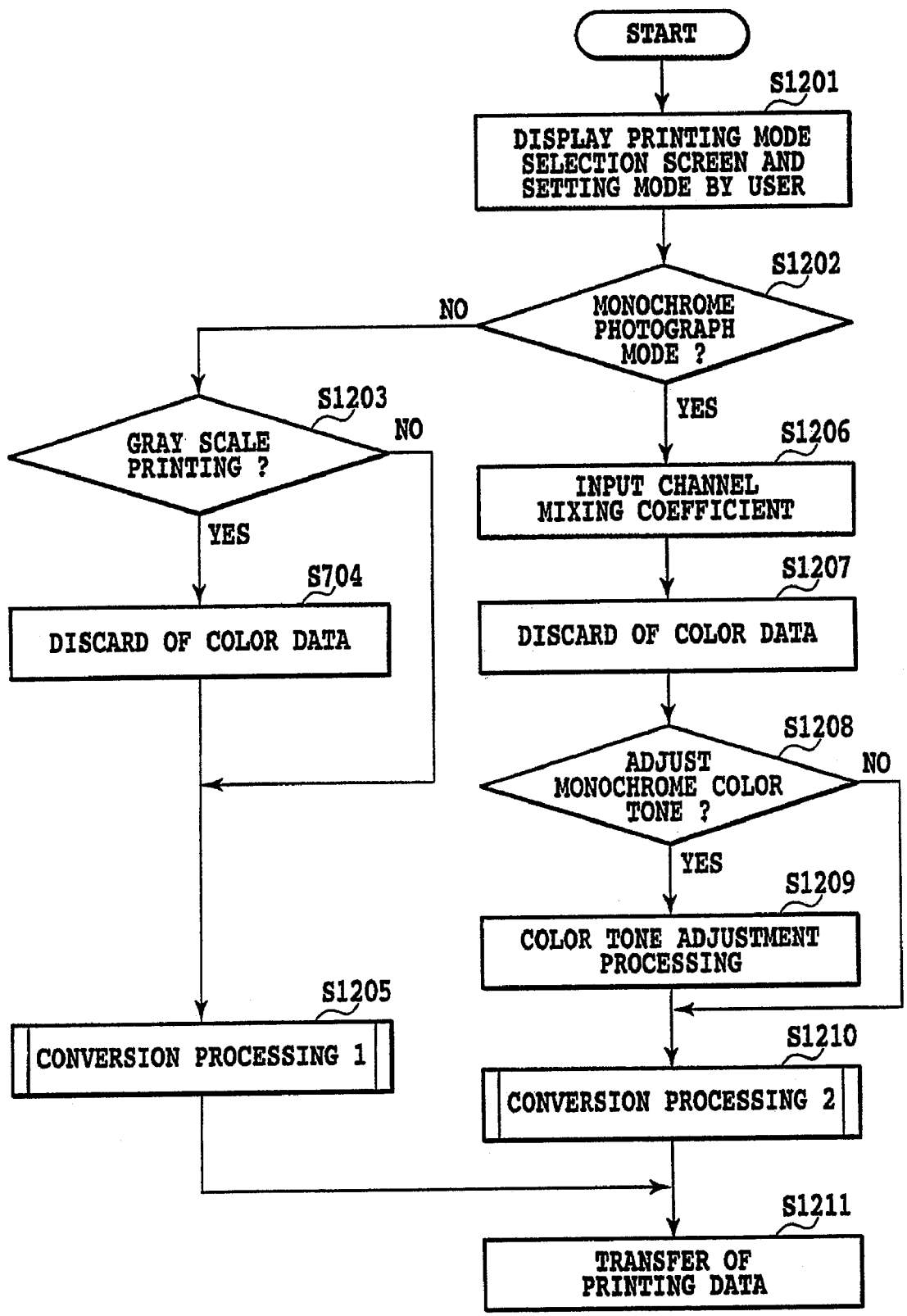
FIG. 12 is a flowchart showing an image processing by a host computer 101 and related processing, including a color conversion processing for determining an ink amount in the case of a monochrome printing according to a second embodiment of the present invention.

FIG. 12 is a flowchart showing image processing and related processing by the host computer 101, including a color conversion processing for determining an ink amount in the case of a monochrome printing according to the second embodiment of the present invention.

This processing is started when a user instructs a printing operation via an application. Then, the CPU 102 firstly displays, on the CRT 108, a screen through which a printing mode is selected (Step S1201).

Figure 13:
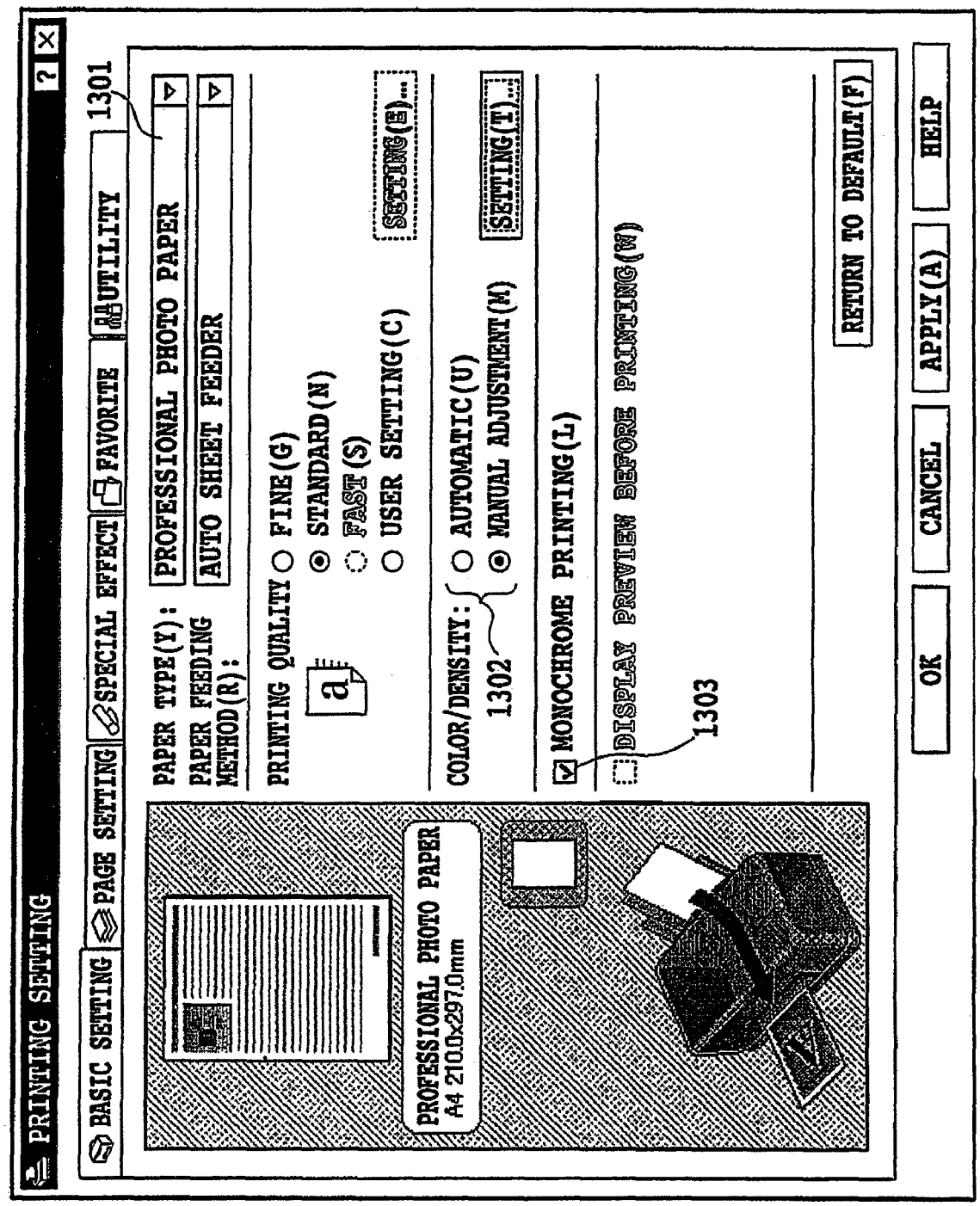
FIG. 13 is a view showing an example of a display screen of the CRT 108 for selecting a printing mode in the processing of FIG. 12.

FIG. 13 is a view showing an example of this display screen. An ink jet printer of this embodiment can provide printing on a plurality of types of printing media and have appropriate printing modes in accordance with the respective printing media. This setting or selection of a printing mode is performed by allowing a user to input several conditions via the screen shown in FIG. 13. In this embodiment, a text box 1301 can be used, as shown in FIG. 13, to set which type of printing medium is printed. A radio button 1302 is used to set whether the adjustment of color and density is performed automatically or manually. A checkbox 1303 is used to set a monochrome printing.

With reference to FIG. 12 again, the subsequent step S1202 determines whether the set printing mode is a monochrome photograph mode or not. In this embodiment, this "monochrome photograph mode" is set when the monochrome printing is selected via the checkbox 1303 and when a professional photo paper is selected via the text box 1301. When the monochrome printing is selected via the checkbox 1303 and a paper type different from the professional photo paper is selected via the text box 1301, then the normal monochrome mode (gray scale printing) other than "monochrome photograph mode" is set.

When step S1202 determines that the printing mode is the monochrome photograph mode, "discard of color data" is performed as in the first embodiment (step S1207). However, in this embodiment, prior to the "discard of color data", step S1206 inputs a coefficient used for the discard of color data. As described above in the first embodiment, the discard of color data converts R, G, and B signals to a brightness signal L. Thus, a coefficient of the conversion equation (channel mixing coefficient) is inputted. Coefficients of 0.3, 0.6, and 0.1 of the respective R. G, and B in this conversion equation are the generally-used ones. A user can input these coefficients via a user interface (not shown) as an operation of a color filter to provide a monochrome mode (discard of color data).

After the above step, step S1207 performs a processing for discarding color information (color component) represented by R, G, and B. This processing is the same as that of the first embodiment but is different from that of the first embodiment in that coefficients a, β, and γ in a conversion equation L=aR+ BG+γB are values inputted by step S1206 as described above.

Next, step S1208 determines whether a color adjustment for a cold tone or a warm tone is performed or not with regards to the monochrome photograph image. This is judged based on the position of the slider for adjusting "monochrome color tone" shown in FIG. 16. Specifically, when the slider for "monochrome color tone" is slid from a neutral position to a warm tone or a cold tone, color adjustment for a warm tone or a cold tone is judged to be performed. Step S1208 determines that the color adjustment is performed, the processing proceeds to step S1209. On the other hand, Step S1208 determines that the color adjustment is not performed, the processing directly proceeds to step S1210.

Next, the color adjustment performed in step S1209 will be described. The color adjustment in this step is performed for the R, G, and B signals that are obtained as a result of an adjustment of "monochrome color tone", "density", and "contrast" that are the three adjustment factors shown in FIG. 16.

Figure 16:
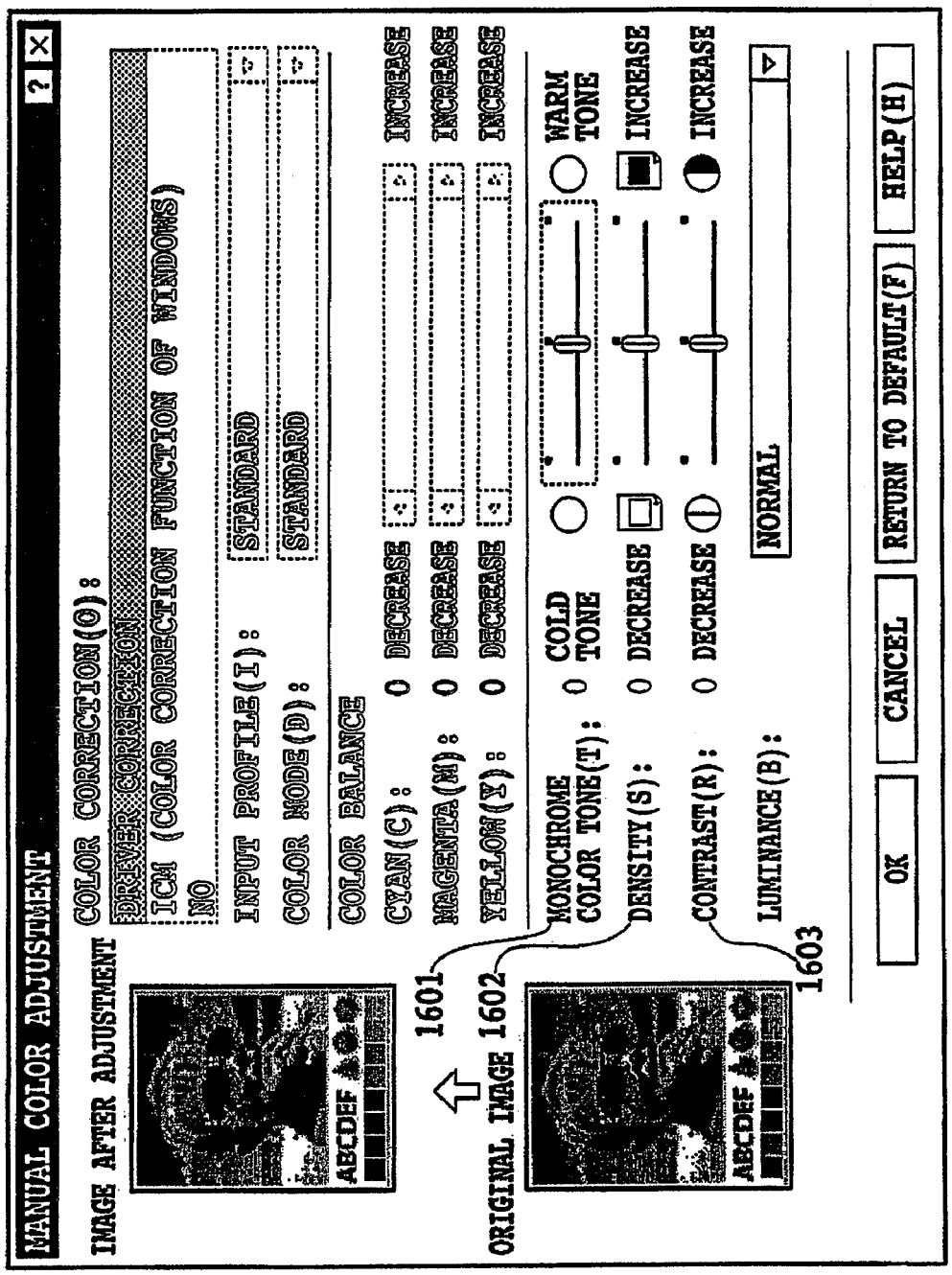
FIG. 16 is a view showing a screen of "manual color tone adjustment" according to the second embodiment.

FIG. 16 shows a user interface for "manual color adjustment" according to the second embodiment. This operation screen is displayed when, in the user setting (FIG. 13) in step S1201 as described above, the monochrome photograph mode is selected (the monochrome printing 1303 and the professional photo paper 1301 are selected) and the radio button 1302 is used to select the manual adjustment. Specifically, when the monochrome photograph mode is selected, adjustment of "monochrome color tone 1601", "density 1602", and "contrast 1603" are active. This allows a user to operate the respective sliders to adjust the respective factors. For example, in "monochrome color tone 1601", the slider is moved toward "cold tone" when a cold tone is desired. When this movement is performed, it is judged in step S1208 that the color adjustment processing as described above is performed. In "density 1602", the slider is moved toward "increase" when increasing the density is desired. Further, in "contrast 1603", the slider is moved toward "increase" when the contrast is desired to be increased.

In the operation screen shown in FIG. 16, the above three adjustment factors may be used for a multiple adjustment. When a user operates all sliders of the "monochrome color tone 1601", "density 1602", and "contrast 1603", this embodiment changes, depending on the respective slide amounts, R, G, and B values in order of "contrast", "density", and "monochrome color tone". When the sliders of two adjustment factors among the three factors are slid, R, G, and B values are changed in an order observing the order of that two factors in the above order. It is noted that a user does not always operate the sliders in this order. When a user slides the sliders in an arbitrary order, the respective slide amounts are retained. When the above setting is fixed by an "OK" button (FIG. 16), R, G, and B values are converted in the above order.

Firstly, R, G, and B values are changed by the contrast adjustment in the manner as described below. When it is assumed that the adjustment value (T) for contrast is adjusted by the slider within a range from −50 to 50, the respective R, G, and B signals are converted by the following expression (3-1) or expression (3-2).

Expression (3-1):
When R, G and B≦128:

$$R'=((R/128)^d) \times 128$$

$$G'=((G/128)^d) \times 128$$

$$B'=((B/128)^d) \times 128$$

where when 0≦T≦50, d=1.00+(0.02×T),
when −50≦T<0, d=1.00/(1.00−(0.02×T))
where 0≦R', G', and B'≦255 and "d" is effective to three places of decimals.

Expression (3-2):
When 128<R, G, and B:

$$R'=((255-R)/127)^d) \times (255-127)$$

$$G'=((255-G)/127)^d) \times (255-127)$$

$$B'=((255-B)/127)^d) \times (255-127)$$

where when 0≦T≦50, d=1.00+(0.02×T), and
when 50≦T<0, d=1.00/(1.00−(0.02×T).)

Secondly, the R, G, and B values are changed by the density adjustment as described below. When it is assumed that the adjustment value (T) for density is adjusted by the slider within a range from −50 to 50, the respective R, G, and B signals are converted be the following expression (4-1) or expression (4-2).

Expression (4-1)
When −25≦T≦50:

$$R''=((R'/255)^b) \times 255$$

$$G''=((G'/255)^b) \times 255$$

$$B''=((B'/255)^b) \times 255$$

Where when 0≦T≦50, b=1.00+(0.02×T), and
When −25≦T<0, b=1.00/(1.00−(0.02×T)).

It is noted that 0≦R", G", and B"≦255, and "b" is effective to three places of decimals.

Expression (4-2)
When −50≦T<−25, $$R''=((255+c)/255) \times (((R'/255)^b) \times 255)-c$$

$$G''=((255+c)/255) \times (((G'/255)^b) \times 255)-c$$

$$B''=((255+c)/255) \times (((B'/255)^b) \times 255)-c$$

Where b=1.00/1.50, c=(64/25)×(T+25)

Thirdly, in accordance with the slide amount of the slider for the monochrome color tone, R", G", and B" are respectively subjected to the warm tone expression (1) or the cold tone expression (2) as described above for the first embodiment so that R, G, and B values are changed.

As described above, step S1209 integrally resolves, into the R, G, and B values, the respective adjustment values of "monochrome color tone", "density" and "contrast". Then, these R, G, and B values are subjected, in the next step S1210, to the "conversion processing 2" similar to step S709 of FIG. 7 of the first embodiment. This can print, even when a monochrome image is subjected to various adjustments, a high-quality image free from color deviation.

Figure 14A:
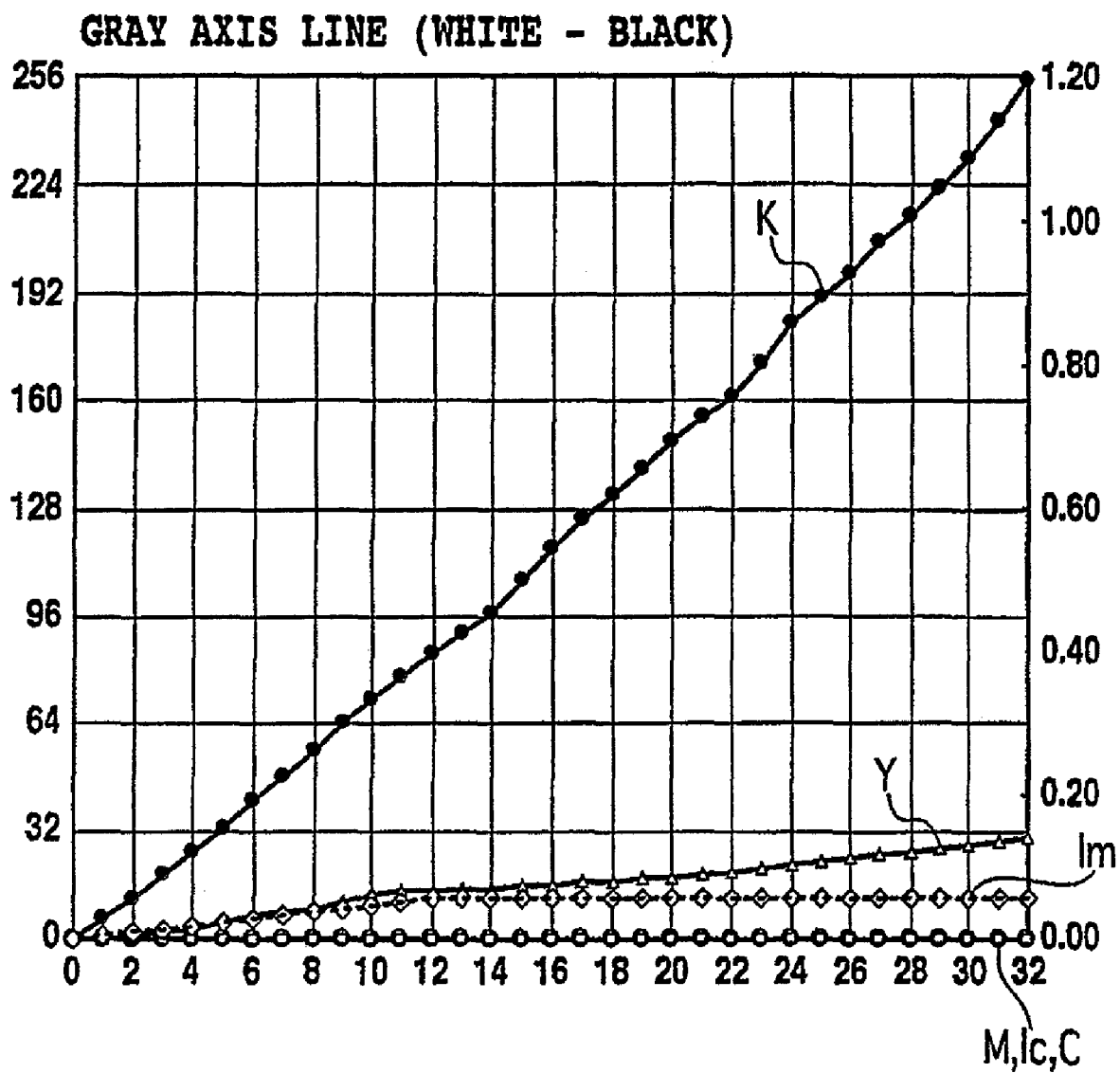
FIGS. 14A and 14B are diagrams schematically showing a look-up table (LUT) used in the post process of the color conversion processing in the conversion processing 2 in the processing of FIG. 12.
Figure 14B:
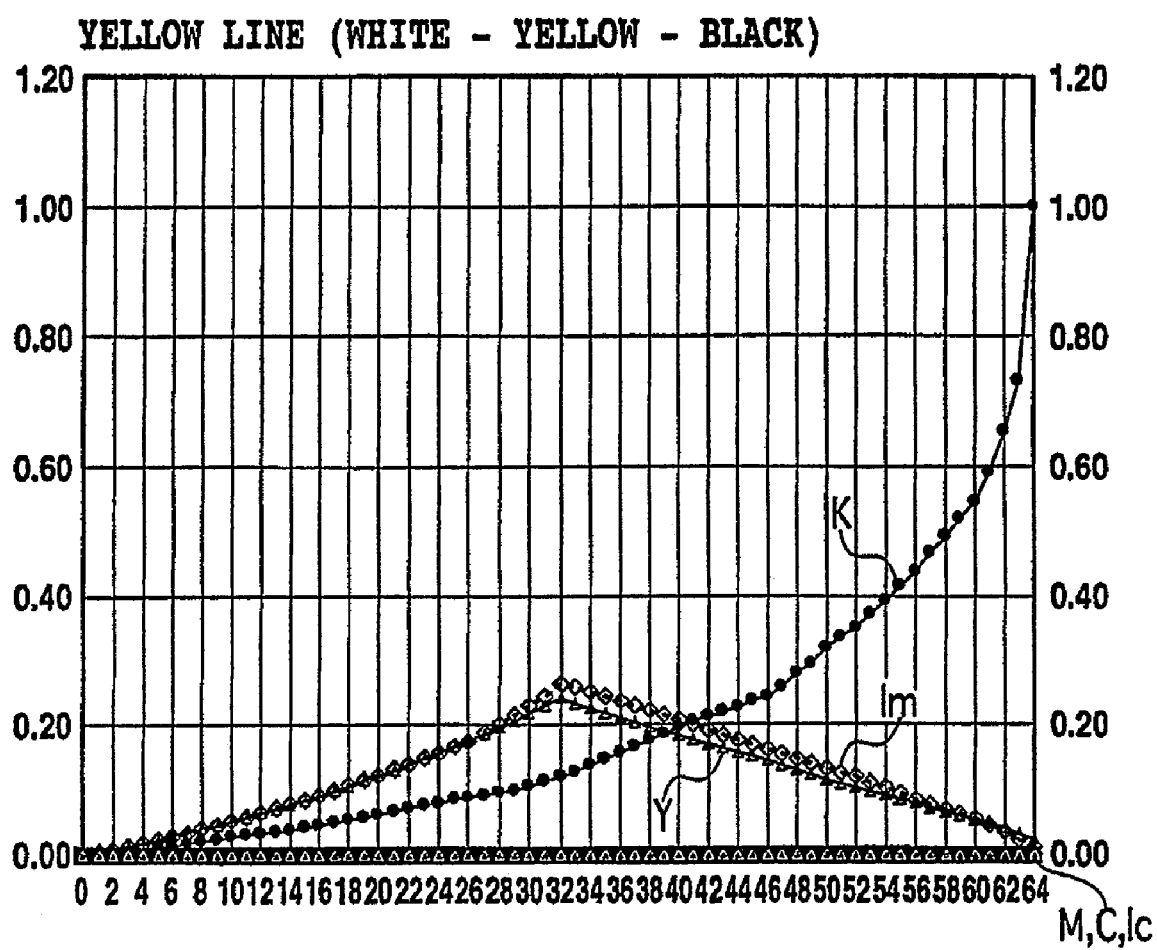

This conversion processing 2 is basically the same as the conversion processing 2 in the first embodiment. FIGS. 14A and 14B are diagrams schematically showing a look-up table (LUT) used in the color conversion processing in the conversion processing 2 of this embodiment and show tables of a gray axis line and a yellow line of LUT as an example. In FIGS. 14A and 14B, the tables are different from the table shown in FIG. 9A-9G according to the first embodiment in that both tables of the gray axis line (FIG. 14A) and the yellow line (FIG. 14B) use light magenta (lm) while the tables shown in FIGS. 9A and 9D use magenta (M). For the other points, the LUT is the same as that of the first embodiment for a density range in which K is used and the relation between this K and ink amount of other chromatic colors.

Specifically, firstly, the LUT of this embodiment also uses black ink, as in the first embodiment, in whole density ranges from a low density to a high density of respective regions of a color reproduction region including the gray axis (FIG. 14A) and regions (FIG. 14B) other than the gray axis. Then, the black ink maintains an output value higher than those of other color inks in whole density ranges. This black ink amount also increases monotonically. By using, in order to print a monochrome image, black ink in whole density regions (whole density ranges) defined by the image data as described above, the use of C, M, and Y for the expression of a monochrome image is avoided. As a result, color deviation due to slight imbalance in the ink amount among these three color inks can be prevented.

Secondly, in the respective regions of the color reproduction region, two chromatic color inks such as light magenta and yellow are used in addition to black ink. These chromatic colors maintain the output values at low levels. Specifically, two chromatic colors or yellow which is one of the colors used in this embodiment is used to express a hue in the color reproduction region, e.g. yellow hue in the yellow line shown in FIG. 14B and is used to suppress the color deviation due to the characteristic of black ink itself used in the color reproduction region or a relative characteristic of the black ink with a printing medium.

As described above, a maximum chroma point of yellow in a normal color separation table defines only an yellow component and does not use other color materials. On the other hand, a table having small gamut for a monochrome image such as table used in the conversion processing 2 previously determines main color such as warm tone or cold tone. Thus, the maximum chroma point of yellow can be previously adjusted with another color (lm) to avoid color deviation.

Figure 15:
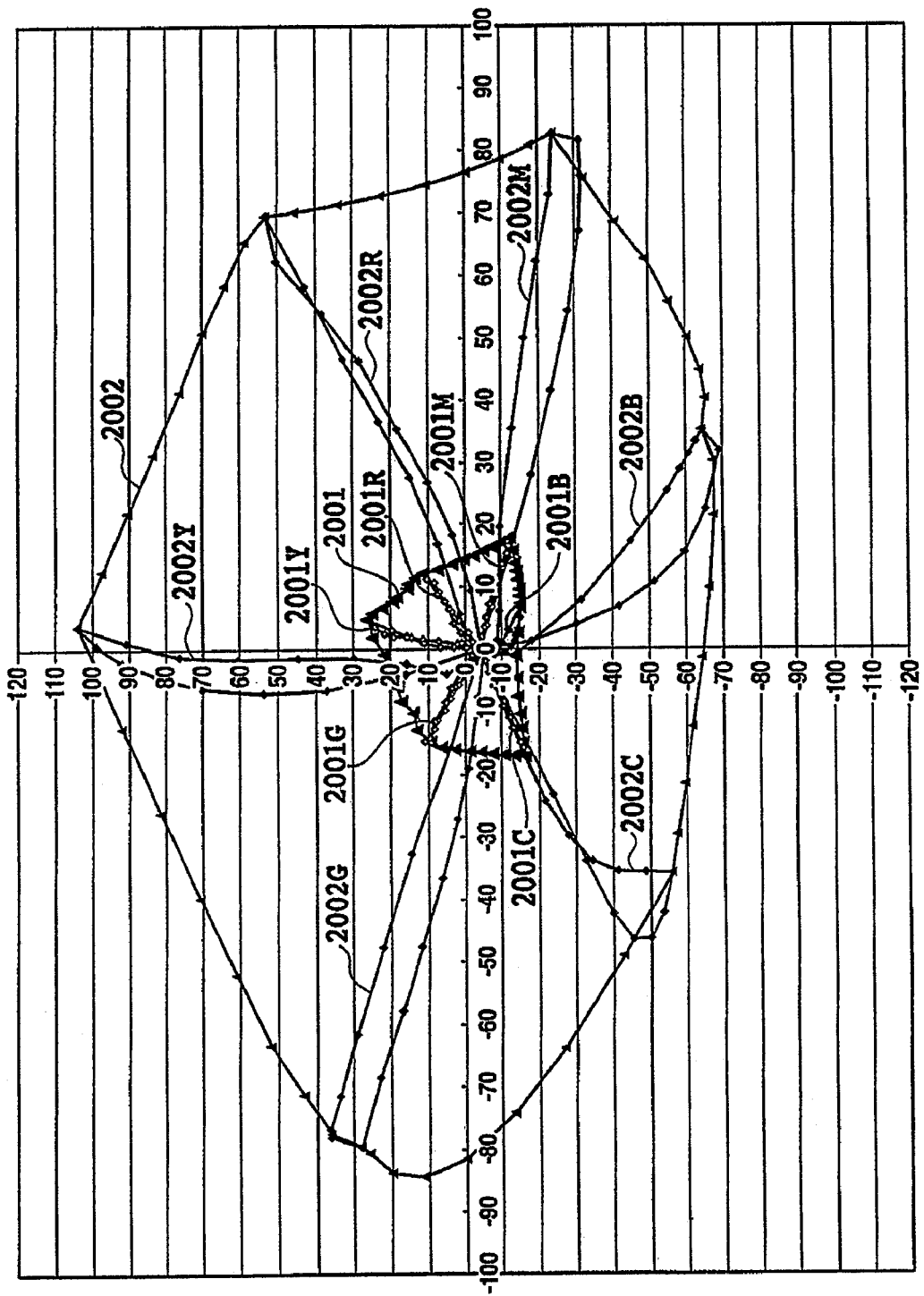
FIG. 15 is a diagram showing a gamut according to the second embodiment compared with a gamut used in the case of color printing.

FIG. 15 is a diagram showing a color reproduction region (gamut) according to the LUT used in the conversion processing 1 and a gamut by the LUT used in the conversion processing 2. FIG. 15 shows the respective gamut represented in an L*a*b* color space observed from the direction of the L* axis with a bird eye view.

In FIG. 15, a gamut 2001 is a gamut of the LUT used in the conversion processing 2 and a gamut 2002 is a gamut of LUT used in the conversion processing 1. In FIG. 15, six hue lines are shown for each gamut. Specifically, in the gamut 2001, hue lines 2001Y, 2001R, 2001M, 2001B, 2001C, and 2001G of yellow, red, magenta, blue, cyan, and green are shown, respectively. FIG. 14B shows a table of the hue line 2001Y. As in the first embodiment, the LUT used in the conversion processing 2 uses black ink in all other hue lines including the hue line 2001Y as well as the hue lines 2001R, 2001M, 2001B, 2001C, that is, every regions of the color reproduction region, and in the whole density regions from a low density region color to a high density region. Then, this gamut 2001 is a color reproduction region smaller than the gamut 2002. Specifically, in the monochrome photograph mode, even when the color tone adjustment of step S1209 is performed, basically a gray or black monochrome image is printed and a color reproduction region is of a small gamut having not so much (high) chroma around the gray axis.

Third Embodiment

Although the above-described the first and the second embodiments have particularly described that black ink is mainly used for hues other than the gray axis, a system that can include both of gray ink and black ink or all of the three of light gray ink, dark gray ink and black ink also can mainly use such achromatic inks. In this case, density signals preferably tend to increase in a monotonic manner if possible. Then, chromatic color ink only has a role of suppressing "color deviation" and a density value of the chromatic color ink is set to be smaller than the density signal values of the achromatic inks.

Other Embodiments

Although the above embodiments has described the present invention by an example of the ink jet printing system having the structure shown in FIG. 5, the present invention is not limited to be applied to this structure. Respective structures actualizing functions shown in FIG. 5 also may be provided in any one of a host computer and an ink jet printer or may be all integrated to be an image formation system.

Further, although the above embodiments has described a case where a series of image processing described with reference to FIG. 6 are all performed by the CPU 102 of the host computer 101, these processing also may be partially or entirely performed by the ink jet printer 107 for example. For example, the color conversion processing 201 and the output gamma correction 202 may be performed in the host computer 101 and quantization processing 203 may be performed in the ink jet printer 107. Further, the input or setting of the print mode described for FIG. 7 also may be not performed by the host computer 107 but performed by the ink jet printer.

Furthermore, the screen for setting a print mode described with reference to FIG. 8 or FIG. 13 is also not limited to have the above-described contents. For example, although the screen of FIG. 8 prepares the checkbox 83 for setting a gray scale printing, another configuration also may be provided, for example, in which a user himself or herself can set the hue and chroma of an output image via the screen so that it can be determined that the monochrome mode is set when the predetermined hue and chroma are set.

Although the above embodiments have described the ink jet printing apparatus that can eject six colors of inks, the present invention also can be used for printing apparatuses other than an ink jet printing apparatus so long as the printing apparatuses can use a plurality of color materials to represent a color image. However, phenomena such as "color deviation" and "granular quality" are an adverse image effect peculiar to an ink jet printing apparatus. Thus, the present invention can be particularly effectively used when being used to an ink jet printing apparatus. However, it is clear from the above description that the present invention also can be applied to a color conversion processing when a monochrome image is printed by an electro-photographic type printing apparatus using toner as color material.

Still Another Embodiment

The scope of the present invention also includes a configuration where an apparatus or a computer in a system connected with various devices to allow the devices to realize the respective functions of the above embodiments is supplied with a program code of the software shown in FIG. 7 and FIG. 12 for realizing the above functions of the embodiments so that the present invention is practiced by operating the respective devices in accordance with the program stored in the system or the computer of the apparatus (CPU or MPU).

In this case, the program code of the software will realize the above-described functions of the embodiments. The program code itself and a means for supplying the program code to the computer (e.g., a storage medium storing this program code) constitute the present invention.

Storage media storing the program code include, for example, floppy disc (registered mark), hard disc, optical disc, magnetooptical disc, CD-ROM, magnetic tape, nonvolatile memory card, and ROM.

Furthermore, by executing the program code supplied to the computer, the above-described function of the embodiments is realized and this program code is included in embodiments of the present invention even when the above-described function of the embodiments is realized by the cooperation by an OS (operating system) in which the program code runs in the computer or another application software.

Furthermore, the present invention also includes a configuration where a supplied program code is stored in a function expansion board of a computer or a memory included in a function expansion unit connected to the computer and then a CPU included in the function expansion board or the function storage unit for example performs, based on an instruction by the program code, a part or the entirety of an actual processing to realize the above-described function of the embodiments.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes.

This application claims priority from Japanese Patent Application No. 2005-118227 filed Apr. 15, 2005, which is hereby incorporated by reference herein.

What is claimed is:

1. An image processing apparatus comprising:
   color conversion means for converting R, G, B signals into a plurality of ink color signals corresponding to amounts of a plurality of color inks to be used, the plurality of color inks including achromatic color ink capable of being used for printing a monochrome image,
   wherein the color conversion means converts the R, G, B signals into the plurality of ink color signals by using a color conversion table that defines a correspondence relation between combinations of the R, G, B signals, which include combinations of the R, G, B signals values of which are the same as each other and combinations of the R, G, B signals values of which are not the same as each other, and combinations of the plurality of ink color signals, so that the achromatic color ink is used in all of a color reproduction region which is reproducible with the plurality of color inks, and wherein the color conversion table defines the correspondence relation so that the amount of the achromatic color ink to be used is larger than an amount of a chromatic color ink to be used in all of the color reproduction region.

2. An image processing apparatus comprising:

setting means for setting a monochrome mode; and conversion means for converting R, G, B signals that represent an image to be printed in the monochrome mode set by the setting means into a plurality of ink color signals corresponding to amounts of a plurality of color inks to be used, the plurality of color inks including achromatic color ink capable of being used for image printing in the monochrome mode, wherein the conversion means converts the R, G, B signals into the plurality of ink color signals by using a color conversion table that defines a correspondence relation between combinations of the R, G, B signals, which include combinations of the R, G, B signals values of which are the same as each other and combinations of the R, G, B signals values of which are not the same as each other, and combinations of the plurality of ink color signals, so that the achromatic color ink is used in all of a color reproduction region which is reproducible with the plurality of color inks, and wherein the color conversion table defines the correspondence relation so that the amount of the achromatic color ink to be used is larger than an amount of a chromatic color ink to be used in all of the color reproduction region.

3. An image processing apparatus comprising:

setting means for setting a plurality of print modes including monochrome and color modes;

first conversion means for converting R, G, B signals that represent an image to be printed in the monochrome mode into a plurality of ink color signals corresponding to amounts of a plurality of color inks to be used, the plurality of color inks including achromatic color ink capable of being used for image printing in the monochrome mode, when the setting means sets the monochrome mode; and second conversion means for converting R, G, B signals that represent an image to be printed in the color mode into a plurality of ink color signals corresponding to amounts of a plurality of color inks to be used, the plurality of color inks including achromatic color ink capable of being used for image printing in the color mode, when the setting means sets the color mode, wherein the first conversion means converts the R, G, B signals into the plurality of ink color signals by using a first color conversion table that defines a correspondence relation between combinations of the R, G, B signals, which include combinations of the R, G, B signals values of which are the same as each other and combinations of the R, G, B signals values of which are not the same as each other, and combinations of the plurality of ink color signals, so that the achromatic color ink is used in all of a color reproduction region which is reproducible with the plurality of color inks, the second conversion means converts the R, G, B signals into the plurality of ink color signals by using a second color conversion table that defines a correspondence relation between combinations of the R, G, B signals, which include combinations of the R, G, B signals values of which are the same as each other and combinations of the R, G, B signals values of which are not the same as each other, and combinations of the plurality of ink color signals, so that the achromatic color ink is used in a part of a color reproduction region which is reproducible with the plurality of color inks, and the reproduction region reproducible when using the first color conversion table is smaller than the reproduction region reproducible when using the second color conversion table, and wherein the first and second color conversion tables define the correspondence relation so that the amount of the achromatic color ink to be used is larger than an amount of a chromatic color ink to be used in all of the color reproduction region, respectively.

4. An image processing apparatus comprising:

color adjustment means for performing a color adjustment for a monochrome image; and conversion means for converting R, G, B signals which is adjusted by the color adjustment means into a plurality of ink color signals corresponding to amounts of a plurality of color inks to be used, the plurality of color inks including achromatic color ink capable of being used for printing the monochrome image, wherein the conversion means converts the R, G, B signals into the plurality of ink color signals by using a color conversion table that defines a correspondence relation between combinations of the R, G, B signals, which include combinations of the R, G, B signals values of which are the same as each other and combinations of the R, G, B signals values of which are not the same as each other, and combinations of the plurality of ink color signals, so that the achromatic color ink is used in all of a color reproduction region which is reproducible with the plurality of color inks, and wherein the color conversion table defines the correspondence relation so that the amount of the achromatic color ink to be used is larger than an amount of a chromatic color ink to be used in all of the color reproduction region.

5. An image processing apparatus as claimed in claim 4, further comprising:

setting means capable of setting color tones that differ from each other as color tones of the monochrome image, wherein the color adjustment means performs the color adjustment based on a result of setting by the setting means.

6. An image processing apparatus as claimed in claim 4, wherein the color adjustment means performs the color adjustment with a change of at least one of the color tone of the monochrome image, density of the monochrome image and a contrast of the monochrome image.

7. An image processing apparatus comprising:

setting means for setting a monochrome mode;

means for converting R, G, B signals that represent an image to be printed in the monochrome mode into brightness signal in which R, G, B values are the same as each other, when the monochrome mode is set by the setting means;

color adjustment means for adjusting values of the R, G, B signals by using the brightness signal and a color adjustment parameter; and conversion means for converting R, G, B signals the values of which the color adjustment means adjusts into a plurality of ink color signals corresponding to amounts of a plurality of color inks to be used, the plurality of color inks including achromatic color ink capable of being used for image printing in the monochrome mode, wherein the conversion means converts the R, G, B signals into the plurality of ink color signals by using a color conversion table that defines a correspondence relation between combinations of the R, G, B signals, which include combinations of the R, G, B signals values of which are the same as each other and combinations of the R, G, B signals values of which are not the same as each other, and combinations of the plurality of ink color signals, so that the achromatic color ink is used in all of a color reproduction region which is reproducible with the plurality of color inks, and wherein the color conversion table defines the correspondence relation so that the amount of the achromatic color ink to be used is larger than an amount of a chromatic color ink to be used in all of the color reproduction region.

8. An image processing method comprising:

a color conversion step of converting R, G, B signals into a plurality of ink color signals corresponding to amounts of a plurality of color inks to be used, the plurality of color inks including achromatic color ink capable of being used for printing a monochrome image, wherein the color conversion step converts the R, G, B signals into the plurality of ink color signals by using a color conversion table that defines a correspondence relation between combinations of the R, G, B signals, which include combinations of the R, G, B signals values of which are the same as each other and combinations of the R, G, B signals values of which are not the same as each other, and combinations of the plurality of ink color signals, so that the achromatic color ink is used in all of a color reproduction region which is reproducible with the plurality of color inks, and wherein the color conversion table defines the correspondence relation so that the amount of the achromatic color ink to be used is larger than an amount of a chromatic color ink to be used in all of the color reproduction region.

9. An image processing method comprising:

a setting step of setting a monochrome mode; and a conversion step of converting R, G, B signals that represent an image to be printed in the monochrome mode set by the setting step into a plurality of ink color signals corresponding to amounts of a plurality of color inks to be used, the plurality of color inks including achromatic color ink capable of being used for image printing in the monochrome mode, wherein the conversion step converts the R, G, B signals into the plurality of ink color signals by using a color conversion table that defines a correspondence relation between combinations of the R, G, B signals, which include combinations of the R, G, B signals values of which are the same as each other and combinations of the R, G, B signals values of which are not the same as each other, and combinations of the plurality of ink color signals, so that the achromatic color ink is used in all of a color reproduction region which is reproducible with the plurality of color inks, and wherein the color conversion table defines the correspondence relation so that the amount of the achromatic color ink to be used is larger than an amount of a chromatic color ink to be used in all of the color reproduction region.

10. An image processing method comprising:

a color adjustment step of performing a color adjustment for a monochrome image; and a conversion step of converting R, G, B signals which are adjusted by the color adjustment step into a plurality of ink color signals corresponding to amounts of a plurality of color inks to be used, the plurality of color inks including achromatic color ink capable of being used for printing the monochrome image, wherein the conversion step converts the R, G, B signals into the plurality of ink color signals by using a color conversion table that defines a correspondence relation between combinations of the R, G, B signals, which include combinations of the R, G, B signals values of which are the same as each other and combinations of the R, G, B signals values of which are not the same as each other, and combinations of the plurality of ink color signals, so that the achromatic color ink is used in all of a color reproduction region which is reproducible with the plurality of color inks, and wherein the color conversion table defines the correspondence relation so that the amount of the achromatic color ink to be used is larger than an amount of a chromatic color ink to be used in all of the color reproduction region.

* * * * *